US012491439B2

(12) United States Patent
Kando et al.

(10) Patent No.: US 12,491,439 B2
(45) Date of Patent: Dec. 9, 2025

(54) COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Yuji Kando, Kyoto (JP); Akira Mizukami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 247 days.

(21) Appl. No.: 18/322,904

(22) Filed: May 24, 2023

(65) Prior Publication Data

US 2023/0381654 A1 Nov. 30, 2023

(30) Foreign Application Priority Data

May 30, 2022 (JP) ................................. 2022-087633

(51) Int. Cl.
*A63F 13/56* (2014.01)
*A63F 13/573* (2014.01)
*A63F 13/577* (2014.01)

(52) U.S. Cl.
CPC ............ *A63F 13/56* (2014.09); *A63F 13/573* (2014.09); *A63F 13/577* (2014.09)

(58) Field of Classification Search
CPC .......... A63F 13/20; A63F 13/40; A63F 13/45; A63F 13/50; A63F 13/52; A63F 13/56;
(Continued)

(56) References Cited

U.S. PATENT DOCUMENTS

| | | | | |
|---|---|---|---|---|
| 11,964,207 B2 * | 4/2024 | Sato | | A63F 13/5258 |
| 2006/0172787 A1 * | 8/2006 | Ellis | | A63F 13/31 463/41 |

(Continued)

FOREIGN PATENT DOCUMENTS

| | | |
|---|---|---|
| JP | 2009-095437 | 5/2009 |
| JP | 2014-023719 | 2/2014 |

OTHER PUBLICATIONS

"Unreal Engine 4.26 Documentation Can Character Step Up" Epicgames, Online: URL: https://docs.unrealengine.com/4.26/en-US/BlueprintAPI/Collision/CanCharacterStepUp/A, Searched on the internet May 6, 2022, 2 pages.

(Continued)

*Primary Examiner* — Omkar A Deodhar
(74) *Attorney, Agent, or Firm* — Nixon & Vanderhye PC

(57) ABSTRACT

A reference position is determined on the basis of a position of a player character before the player character performs a target action at a first position. When the player character comes into contact with a terrain object at a second position by performing the target action, whether or not a height of the second position with respect to the reference position is equal to or greater than a height threshold is determined. When it is determined that the height of the second position is equal to or greater than the height threshold, the player character is caused to move in a forced movement direction that is a direction toward the first position side with respect to the terrain object among directions away from the terrain object or is a downward direction along the terrain object.

20 Claims, 22 Drawing Sheets

(58) Field of Classification Search
CPC ...... A63F 13/57; A63F 13/577; A63F 13/573; A63F 13/70
See application file for complete search history.

(56) References Cited

U.S. PATENT DOCUMENTS

| | | | | |
|---|---|---|---|---|
| 2014/0028544 | A1* | 1/2014 | Amano | G09G 5/00 345/156 |
| 2021/0236932 | A1* | 8/2021 | Perez | G06T 13/40 |

OTHER PUBLICATIONS

"Unreal Engine 4.26 Documentation Can Character Step Up" Epicgames, Online: URL: https://docs.unrealengine.com/4.2/en-US/BlueprintAPI/Collision/CanCharacterStepUp/, Searched on the internet May 6, 2022, 2 pages.
Aug. 19, 2025 Office Action issued in Japanese Patent Application No. 2024-180545, pp. 1-4 [machine translation included].

* cited by examiner

COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2022-087633 filed on May 30, 2022, the entire contents of which are incorporated herein by reference.

FIELD

The present disclosure relates to game processing that allows a player object to perform an action (e.g., jump) for getting over a predetermined step.

BACKGROUND AND SUMMARY

Hitherto, a technology (game engine) capable of setting related to collisions of characters has been known. In such a technology, when a character for which a spherical collision is set gets on a predetermined object, the character can be caused to slide or not to slide in accordance with the collision of the object, by turning on or off setting of a predetermined parameter related to the collision.

The above technology merely allows the character having the spherical collision to slide in accordance with the setting of the parameter. Here, the case where a step having a height which is not desirable for the character to get over is provided, is assumed. In this case, by causing the character to jump, it may be possible for the character to forcibly get over such a step. For example, when the difference between the height of the jump and the height of the step is slight, even if the character is set so as to slide in accordance with the collision, it may be possible for the character to forcibly get over the step due to the momentum of the jump. As a result, it may be possible for the character to move beyond a movable range of the character assumed by the developer of the game.

Therefore, an object of the present disclosure is to provide a computer-readable non-transitory storage medium, an information processing apparatus, an information processing system, and an information processing method that can limit a movable range of a character to an appropriate range.

In order to attain the object described above, for example, the following configuration examples are exemplified.

(Configuration 1)

Configuration 1 is directed to a computer-readable non-transitory storage medium having stored therein instructions that, when executed by a computer of an information processing apparatus, cause the computer of the information processing apparatus to:

- cause a player character to move and perform a target action in a virtual space in accordance with an input by a user;
- determine a reference position on the basis of a position of the player character before the player character performs the target action at a first position;
- when the player character comes into contact with a terrain object at a second position by performing the target action, determine whether or not a height of the second position with respect to the reference position is equal to or greater than a height threshold; and
- when it is determined that the height of the second position with respect to the reference position is equal to or greater than the height threshold, cause the player character to move in a forced movement direction that is a direction toward the first position side with respect to the terrain object among directions away from the terrain object or is a downward direction along the terrain object.

According to the above configuration, control in which the player character is not caused to move beyond the terrain object can be performed on the basis of the determination using the height threshold. Accordingly, the movable range of the player character can be limited to an appropriate range (range intended by a developer).

(Configuration 2)

According to Configuration 2, in Configuration 1 described above, the player character may be caused to perform a jump as the target action on the basis of an input by the user; and a position at which the player character starts the jump may be determined as the reference position.

According to the above configuration, it is possible to reliably prevent a location that is not desirable to be got over by a jump, from being got over.

(Configuration 3)

According to Configuration 3, in Configuration 2 described above, a position of feet of the player character when the player character starts the jump may be determined as the reference position.

According to the above configuration, even if the height (stature and size) of the player character changes, for example, by switching the operation character or changing the outer shape of the player character due to some gimmick during game play, the same value can be used as the height threshold.

(Configuration 4)

According to Configuration 4, in Configuration 3 described above, the jump may be controlled such that a height to which the feet of the player character are raised by the jump is the same when the feet of the player character are in contact with a ground in the virtual space and when the player character floats on a water surface and the feet of the player character are located below the water surface in the virtual space.

According to the above configuration, the necessity to use a different height threshold depending on the location where the player character jumps is eliminated. Accordingly, the processing can be simplified.

(Configuration 5)

According to Configuration 5, in Configurations 1 to 4 described above, only when it is determined that the terrain object at the second position is not a slope, the player character may be caused to move in the forced movement direction.

According to the above configuration, only when the second position is, for example, a steep slope on which it seems unnatural to stand, the player character is caused to perform forced movement. Accordingly, it is possible to prevent the user from being made to feel uncomfortable by the player character being caused to perform the forced movement even when the player character gets over a step without hitting a corner of the step for some reason or even when the player character lands on a gentle slope.

(Configuration 6)

According to Configuration 6, in Configurations 1 to 5 described above, a direction based on a normal direction at the second position of the terrain object may be used as the forced movement direction.

According to the above configuration, it is possible to cause the player character to move so as to rebound on the surface of the contacted terrain object. Accordingly, it is made easier for the user to recognize that the terrain object is a terrain object that cannot be got over by a jump or the like.

(Configuration 7)

According to Configuration 7, in Configuration 6 described above, when the normal direction at the second position of the terrain object includes a vertical component, a direction obtained by setting the vertical component to 0 in the normal direction may be used as the forced movement direction.

According to the above configuration, it is possible to prevent the player character from unnaturally rebounding in a direction opposite to the gravity direction.

(Configuration 8)

According to Configuration 8, in Configurations 1 to 7 described above, when a vertical component of a normal direction at the second position of the terrain object is greater than an upward component threshold, a direction from the second position toward the first position may be used as the forced movement direction.

According to the above configuration, when the second position is a surface close to being horizontal, if the player character is caused to move in the normal direction at the second position, the horizontal component (lateral component) of the normal direction is reduced, so that the direction of the horizontal component changes significantly due to a slight difference in unevenness at the second position. Therefore, when the second position is a surface close to being horizontal, the normal direction is not used, and the direction from the second position toward the first position is used as the forced movement direction, whereby it is possible to prevent movement in which rebound is performed in a direction that is uncomfortable for the user.

(Configuration 9)

According to Configuration 9, in Configurations 1 to 8 described above, when it is determined that the height of the second position with respect to the reference position is less than the height threshold, the player character may be caused to move on the basis of a collision of the terrain object and a collision of the player character.

According to the above configuration, if the height of the second position with respect to the reference position is less than the height threshold, processing can be performed by normal collision determination. Therefore, the user is not made to feel uncomfortable about the movement of the player character more than necessary.

(Configuration 10)

According to Configuration 10, in Configurations 1 to 9 described above, even when the player character comes into contact with the terrain object at the second position along the terrain object by performing the target action, when it is determined that the height of the second position with respect to the reference position is equal to or greater than the height threshold, the player character may be caused to move in the forced movement direction.

According to the above configuration, when the user tries to get over a certain terrain object by a vertical jump, it is possible to make the user recognize that this terrain object is a terrain object that cannot be got over.

(Configuration 11)

According to Configuration 8, in Configurations 1 to 10 described above, a mesh of the terrain object and the collision of the terrain object may match each other.

According to the above configuration, for a terrain object having a step, it is possible to make the user visually determine whether or not it is possible to get over the step.

According to the exemplary embodiments, the range of movement of the player character can be limited to, for example, a range of movement intended by the game developer. Accordingly, it is possible to provide game play having appropriate game balance to the user, so that it is possible to improve the entertainment characteristics of the game.

DETAILED DESCRIPTION OF NON-LIMITING EXAMPLE EMBODIMENTS

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
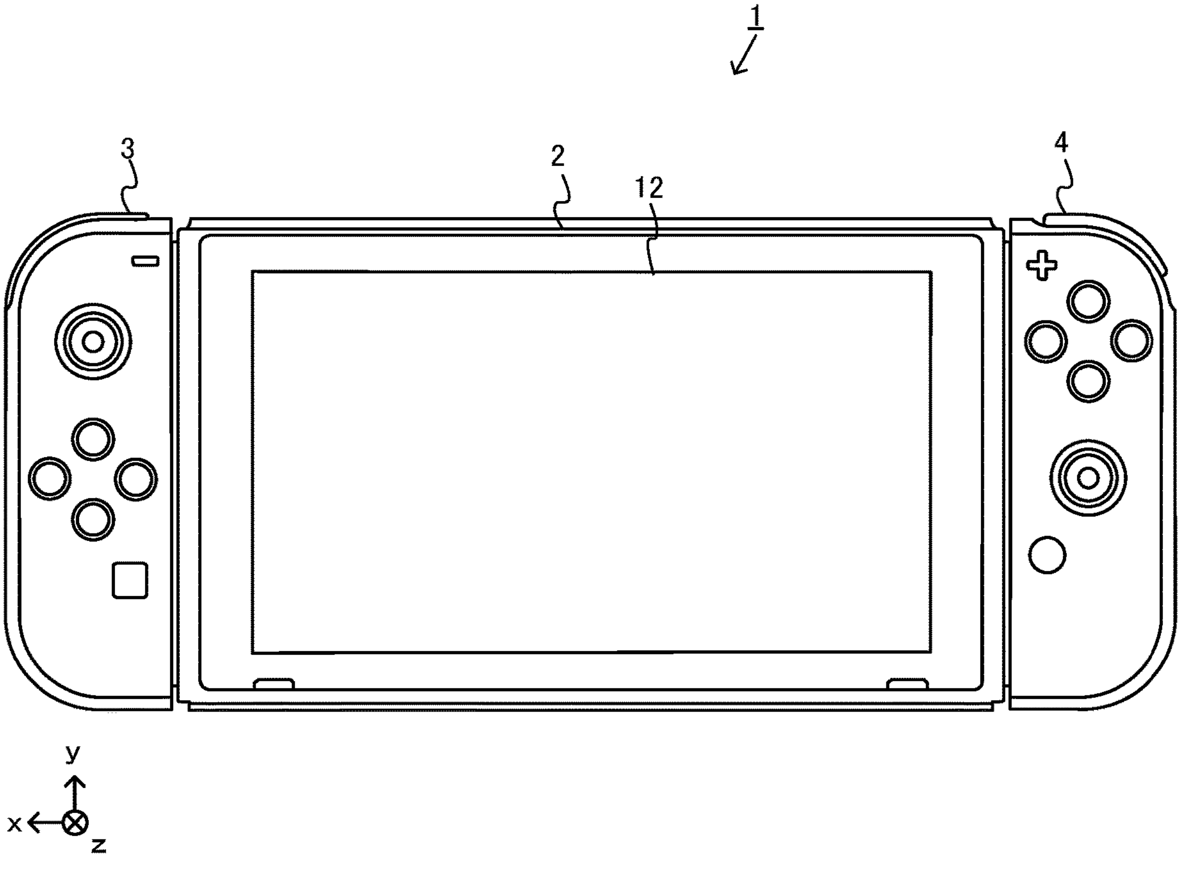
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
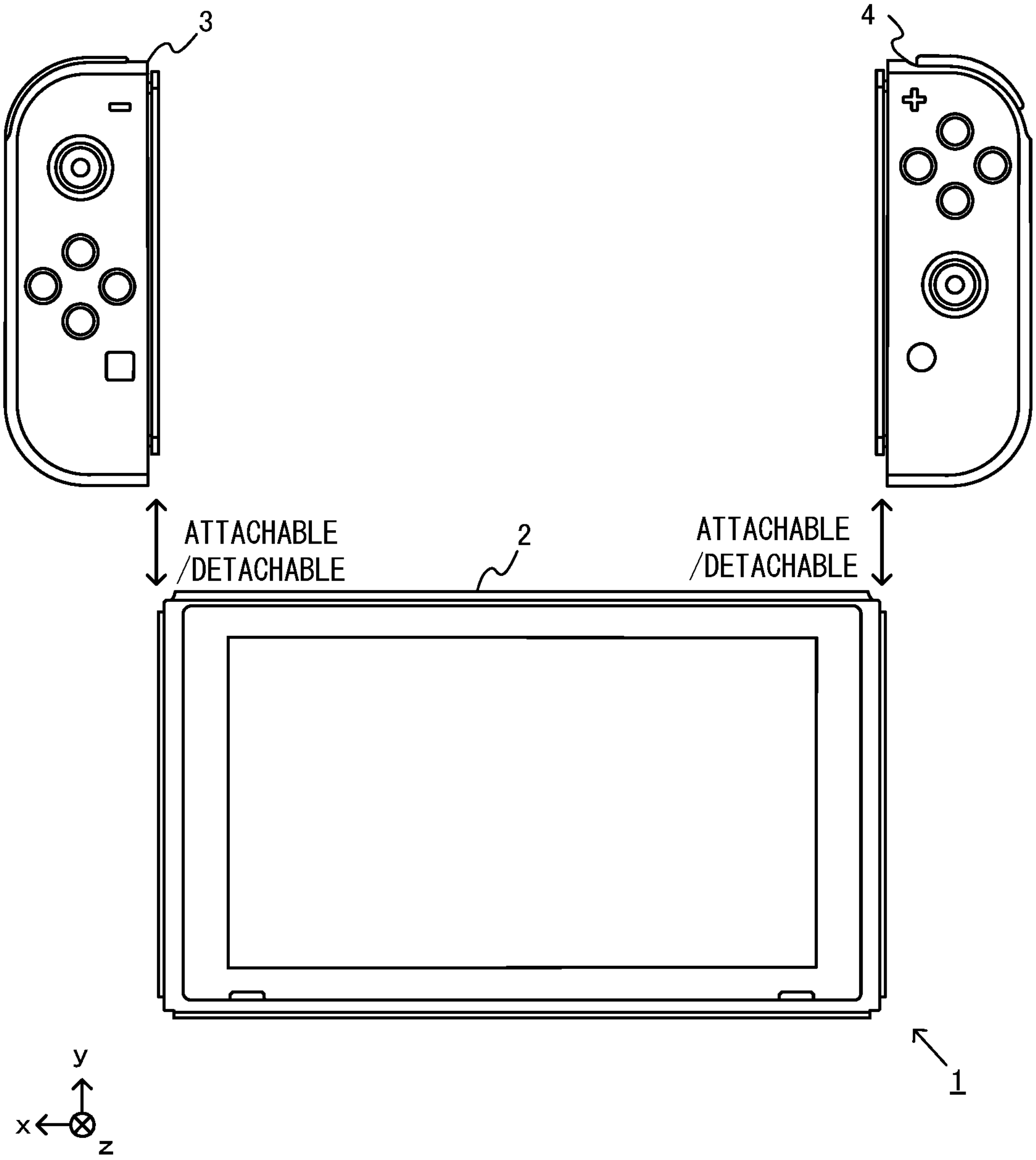
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
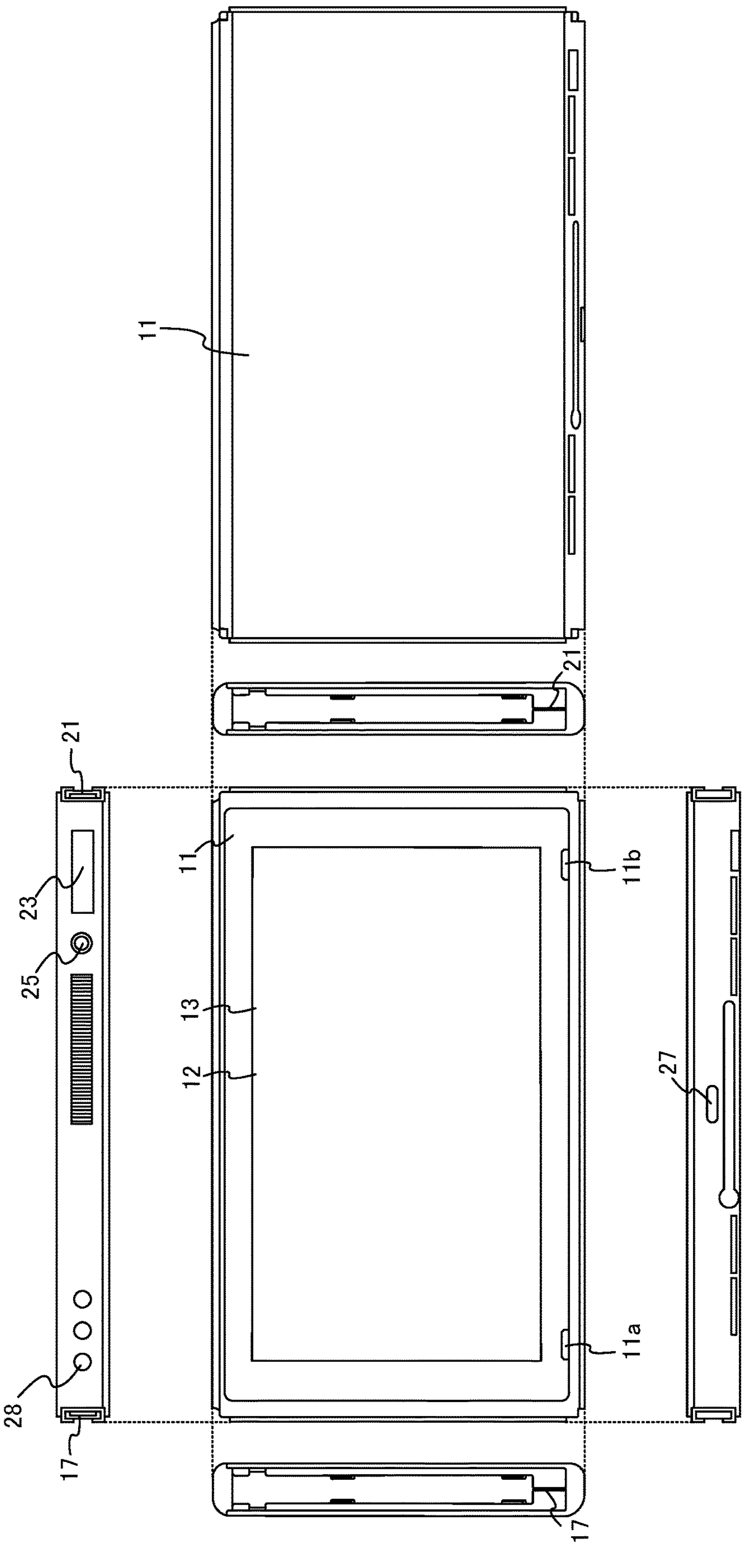
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11*a* and 11*b* are formed in the main surface of the housing 11. Then, sounds outputted from the speakers 88 are outputted through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
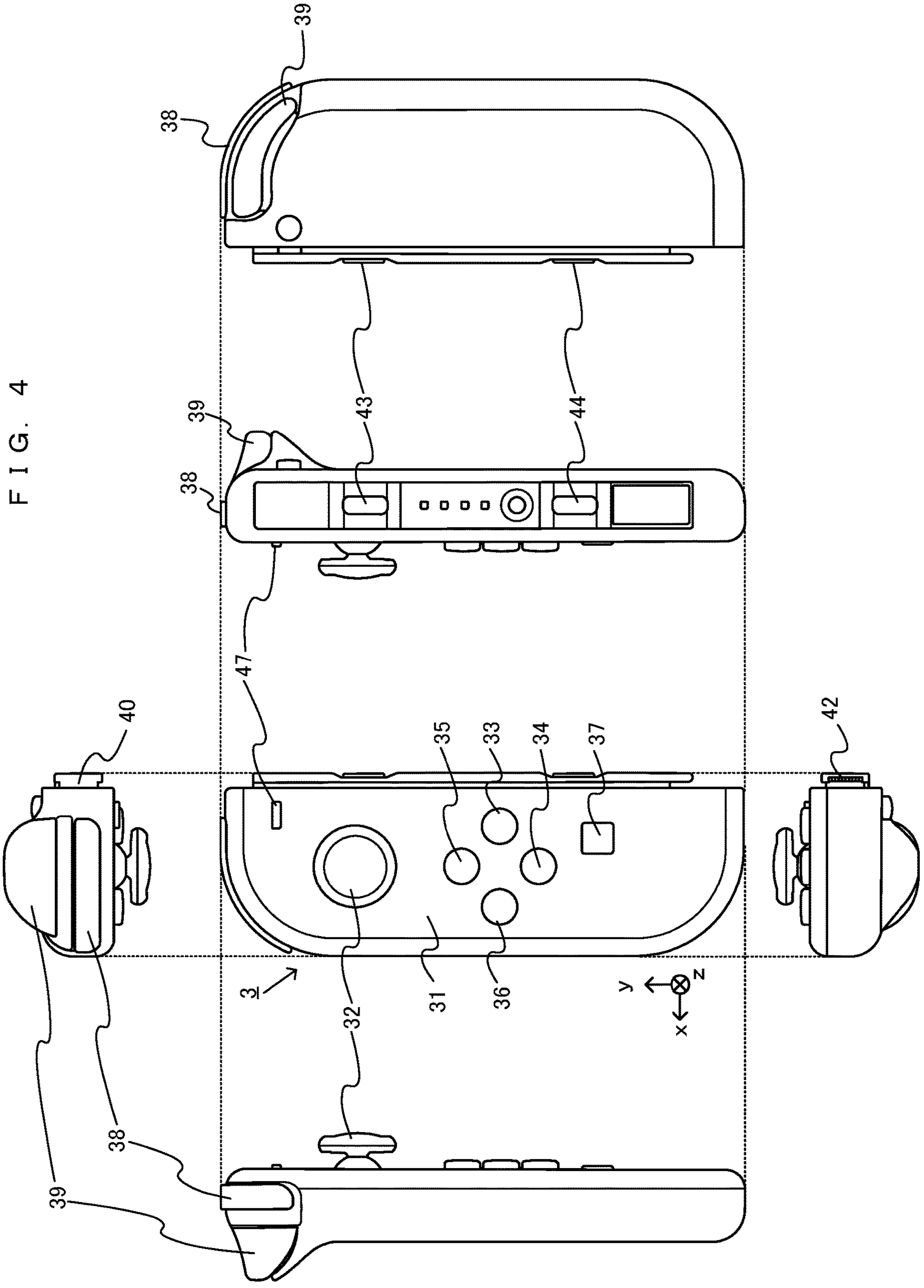
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
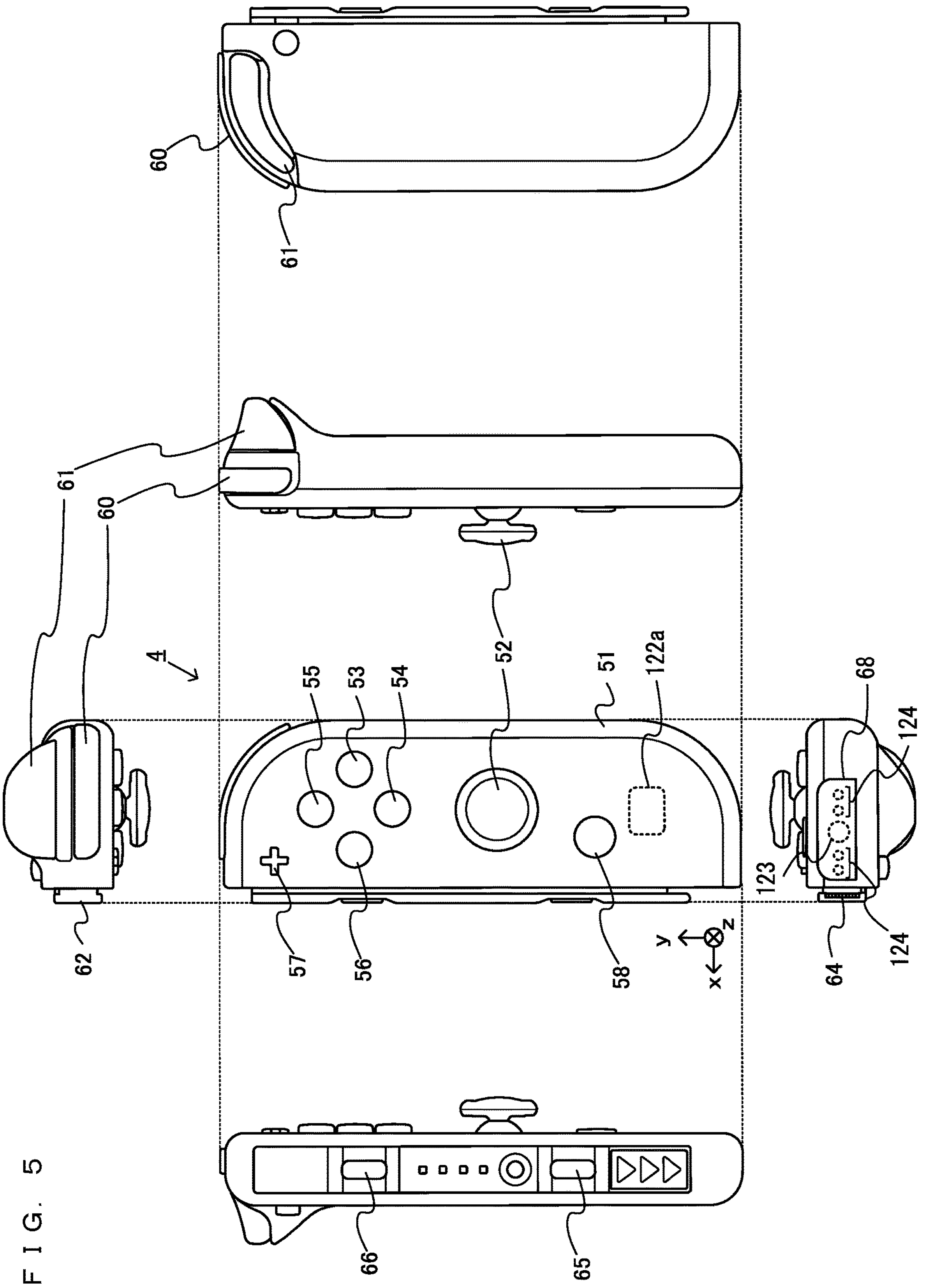
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
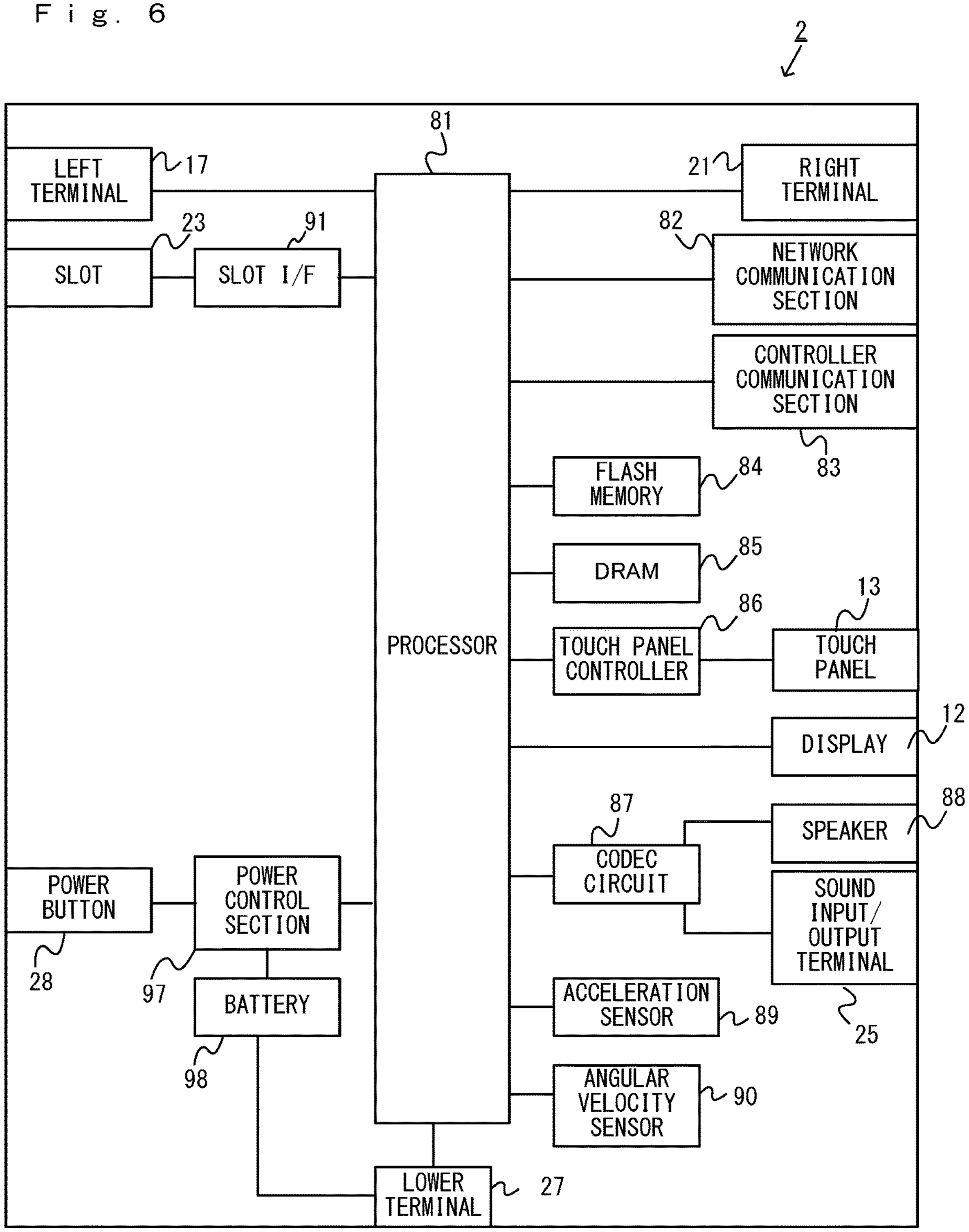
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
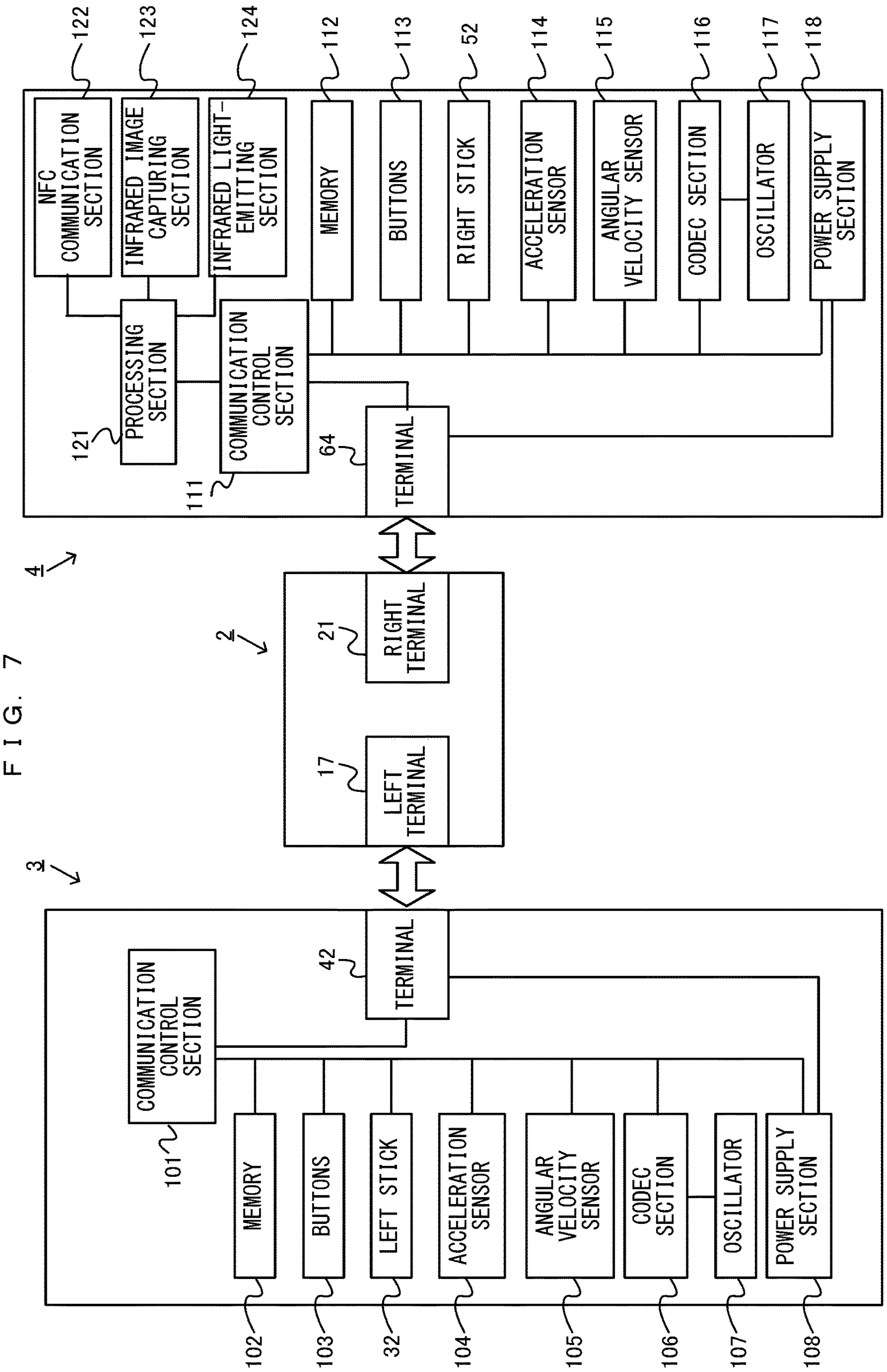
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Next, the outline of operation of the game processing executed by the game system 1 according to the exemplary embodiment will be described. As described above, in the game system 1, the main body apparatus 2 is configured such that each of the left controller 3 and the right controller 4 is attachable thereto and detachable therefrom. In a case of playing the game with the left controller 3 and the right controller 4 attached to the main body apparatus 2, a game image is outputted to the display 12. In a case where the main body apparatus 2 alone with the left controller 3 and the right controller 4 detached therefrom is mounted on the cradle, the main body apparatus 2 can output a game image to a stationary monitor or the like via the cradle. In the exemplary embodiment, the case of playing the game in the latter manner will be described as an example. Specifically, the main body apparatus 2 alone with the left controller 3 and the right controller 4 detached therefrom is mounted on the cradle, and the main body apparatus 2 outputs a game image and the like to a stationary monitor or the like via the cradle.

SCREEN EXAMPLES

Figure 8:
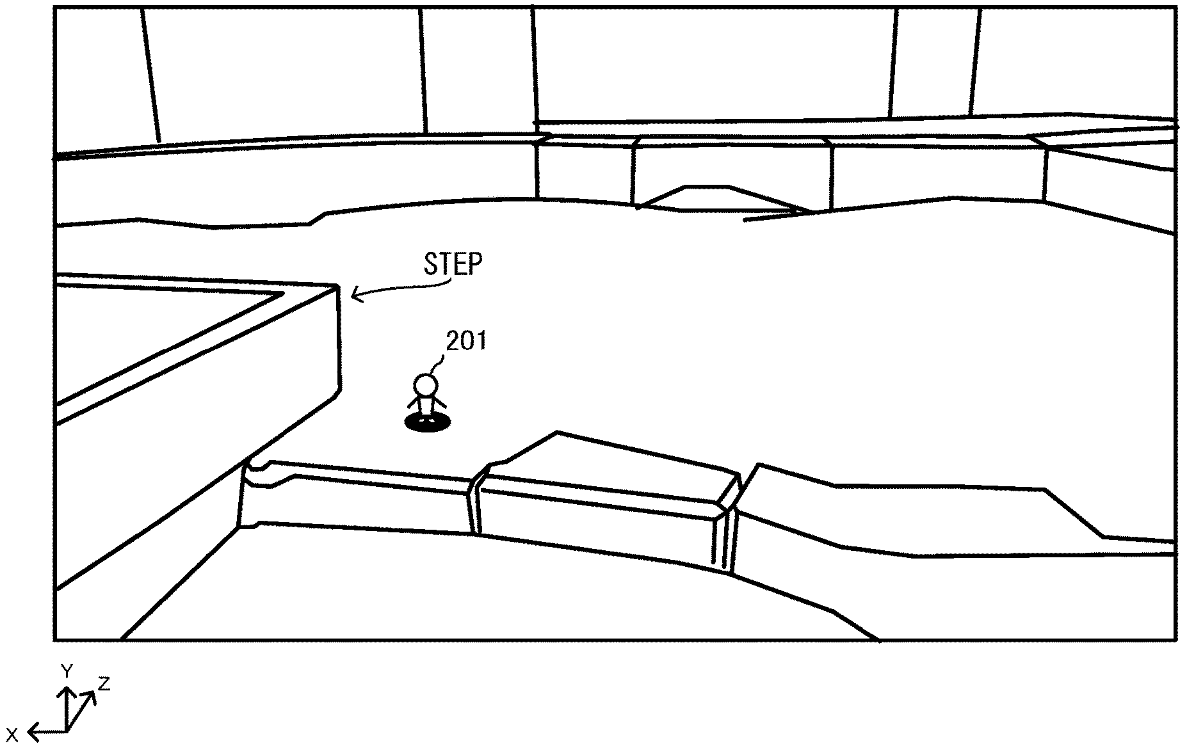
FIG. 8 shows a non-limiting example of a game screen according to an exemplary embodiment.

FIG. 8 shows an example of a screen of the game generated by taking, with a virtual camera, an image of a virtual game space that is a stage for the game. In the exemplary embodiment, the case where the virtual game space is a three-dimensional space is taken as an example, but in another exemplary embodiment, the virtual game space may be a two-dimensional space. In addition, in the exemplary embodiment, a third-person-view screen is illustrated as an example, but the game screen may be a first-person-view screen. In FIG. 8, a player character object (hereinafter, referred to as PC) 201 is displayed. The PC 201 is an object to be operated by a user. In the exemplary embodiment, a humanoid object is illustrated as the PC 201, but in another exemplary embodiment, the PC 201 may not necessarily be a humanoid object, and may be, for example, an object representing a quadrupedal animal as a motif.

In FIG. 8, a terrain object having a "step" on the left side of the PC 201 is also displayed. Processing described in the exemplary embodiment is processing for controlling whether or not to cause the PC 201 to get over the step when the PC 201 performs a predetermined action. Specifically, it is possible for the PC 201 to perform a "jump", which is an example of the predetermined action, on the basis of an operation by the user, etc. When the PC 201 jumps toward the step, whether or not to cause the PC 201 to get over the step is determined, and the movement of the PC 201 is controlled.

Here, supplementary description will be given regarding the "jump". The "jump" in the exemplary embodiment is not limited to a jump performed on the basis of a (voluntary) jump operation by the user as described above. For example, the case where the PC 201 automatically jumps (is caused to jump) by getting on a jump stand, a spring, or the like that are installed in the virtual space is also included. In addition, for example, the PC 201 may be a bird object, and an action in which the PC 201 temporarily ascends by "flapping" when gliding may also be treated as an action corresponding to the "jump".

In the exemplary embodiment, for simplicity of description, a description will be given with the case where the movement direction of the PC 201 cannot be changed on the basis of an operation by the user while the PC 201 is jumping, as an example. In another exemplary embodiment, it may be possible to change the movement direction of the PC 201 on the basis of an operation by the user even while the PC 201 is jumping. The processing described below can also be applied to this case.

Hereinafter, control according to the exemplary embodiment will be described. Before that, a brief description of an assumed step is given as a premise for the following description. The above step is assumed as a step that the developer of the game "does not desire" the PC 201 to get over by a jump from a ground having a certain height, from the viewpoint of game design, etc. In other words, the step can also be said to have a role of limiting the movable range of the PC 201. The processing described below itself is executed without distinguishing what kind of step a step is.

Figure 9:
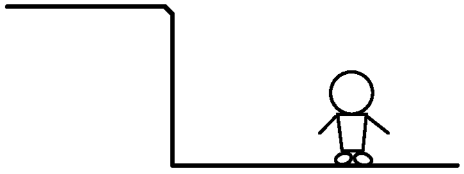
FIG. 9 illustrates an outline of processing according to the exemplary embodiment.
Figure 10:
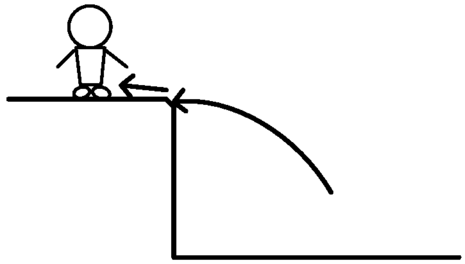
FIG. 10 illustrates the outline of the processing according to the exemplary embodiment.

Next, the problems, etc., in the case of processing by a conventional method when the PC 201 jumps toward such a step that the developer "does not desire" the PC 201 to get over, will be described. FIG. 9 is a schematic diagram showing the positional relationship between a step and the PC 201 in a planar view (e.g., xy-plane). Here, it is assumed that the height of the step is very slightly higher than the highest reach point of the feet of the PC 201 during a jump. That is, it is assumed that a positional relationship is established such that when the PC 201 jumps vertically from the height of the base of the step, the PC 201 barely reaches the top of the step (as for the necessity of a step having such a height relationship, at least the necessity to place such a step may arise from the viewpoint of game design, game balance, etc.). In such a situation, if the movement of the PC 201 is performed, for example, through physics calculation, there is a possibility that, for some reason, the PC 201 gets over a step which is originally desirable for the PC 201 to get over. For example, when the PC 201 is caused to jump toward the step (e.g., after an approach run), a movement mode may occur as shown in FIG. 10. FIG. 10 illustrates an example of a movement mode in the case where the feet of the PC 201 just barely come into contact with a corner of the step. FIG. 10 shows that in this case, the PC 201 moves such that the PC 201 is momentarily caught by the corner of the step, but as a result of physics calculation that takes into consideration the collision with the step, the thrust or the like of the PC 201 acts such that the PC 201 can move forward in the travelling direction. Therefore, in the case where the game balance, etc., are adjusted on the assumption that this step cannot be got over, it may be impossible to provide a game having appropriate game balance to the user.

Figure 11:
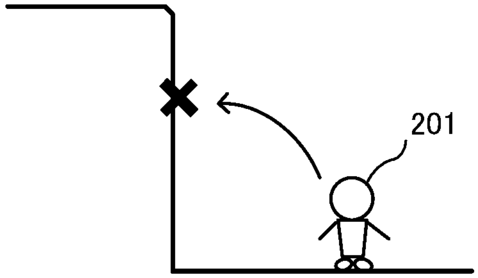
FIG. 11 illustrates the outline of the processing according to the exemplary embodiment.
Figure 12:
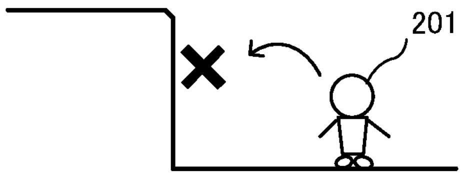
FIG. 12 illustrates the outline of the processing according to the exemplary embodiment.
Figure 13:
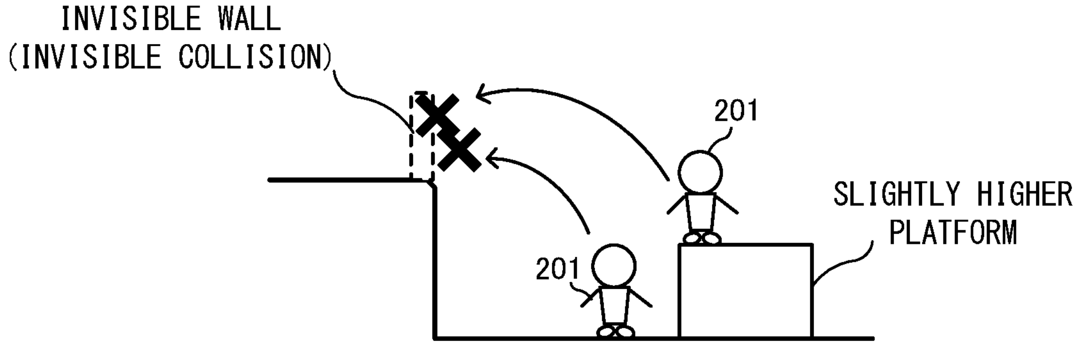
FIG. 13 illustrates the outline of the processing according to the exemplary embodiment.

Here, as for the above step which "is not desirable" to be got over, the following methods are conceivable as methods for more reliably preventing the step from being got over. First, it is conceivable to simply increase the height of the step at the above location as shown in FIG. 11. In addition, a method in which the jump performance (highest reach point) of the PC 201 is set lower as shown in FIG. 11 is also conceivable. That is, this method is a method in which a clear difference is provided between the highest reach point and the height of the step. However, in these methods, the height of the jump becomes relatively low with respect to the height of the step, so that a refreshing feeling for a jump may be lost. In addition, especially when the step itself is made higher, there is also a concern that the appearance may be impaired from the viewpoint of map design, etc. In light of these points, as a method different from the above, for example, a method in which an invisible collision that is higher than the step, such as an "invisible wall", is set without changing the appearance of the step portion, as shown in FIG. 13, is also conceivable. Accordingly, it is possible to reliably prevent the step from being got over by a jump, without changing the appearance of the step. However, in this case, for example, even when the PC 201 jumps from a slightly higher platform, the invisible wall may block the PC 201 from moving forward, and in such a case, the user is made to feel uncomfortable.

Therefore, in consideration of the above points, in the exemplary embodiment, control in which the PC 201 is not caused to get over the above step is performed by performing the following processing, so that the range of movement of the PC 201 becomes an appropriate range.

Figure 14:
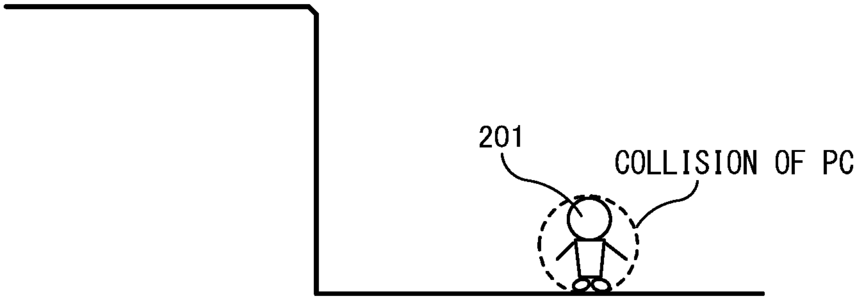
FIG. 14 illustrates the outline of the processing according to the exemplary embodiment.

Hereinafter, an outline and principle of the processing according to the exemplary embodiment will be described with reference to FIG. 14 to FIG. 21. FIG. 14 is a schematic diagram showing a positional relationship between the PC 201 and a step in a state before the PC 201 jumps. In the exemplary embodiment, the case where a spherical collision centered at the center point of the PC 201 is set as an example of a collision set for the PC 201, is illustrated. In addition, it is assumed that the radius of the spherical collision is 16 cm and the spherical collision is large enough to cover the entirety of the PC 201. Moreover, for a terrain object having the above step, a collision that matches a mesh model of the terrain object is set.

Figure 15:
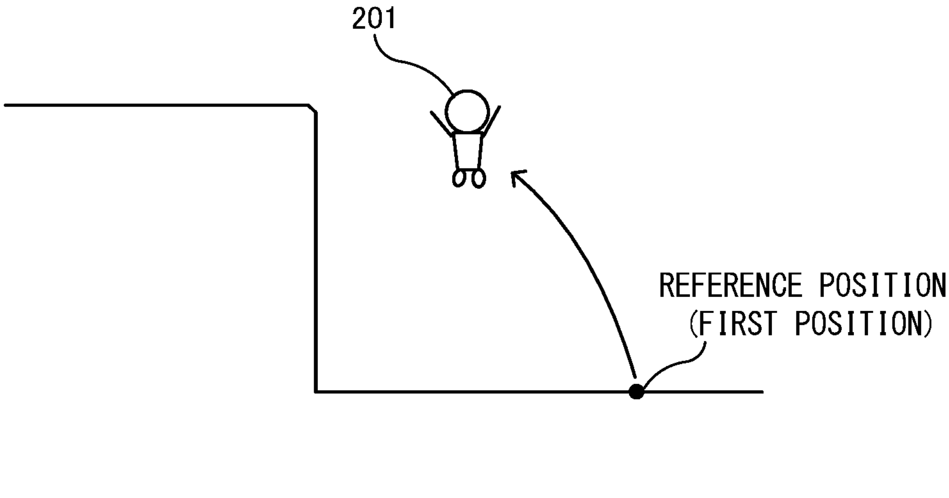
FIG. 15 illustrates the outline of the processing according to the exemplary embodiment.

From the state shown in FIG. 14, when the user performs an operation for causing the PC 201 to jump (e.g., presses the A-button 53), movement parameters such as initial speed and acceleration for the jump are calculated and set. Then, as shown in FIG. 15, the PC 201 moves (jumps) along a trajectory based on the movement parameters. Here, in the exemplary embodiment, the position of the feet of the PC 201 at the start of the jump is stored as a first position. Hereinafter, the first position is referred to as "reference position".

Here, supplementary description will be given regarding the "reference position". In the exemplary embodiment, since a humanoid object having feet is assumed, the position at which the feet are in contact with the ground is defined as the reference position. In this regard, in the case where the PC 201 is an object having no feet (e.g., a snail or the like), the position at which the object is in contact with the ground may be defined as the reference position. For example, a position that is substantially the center of the contact surface of such an object may be defined as the reference position.

Figure 16:
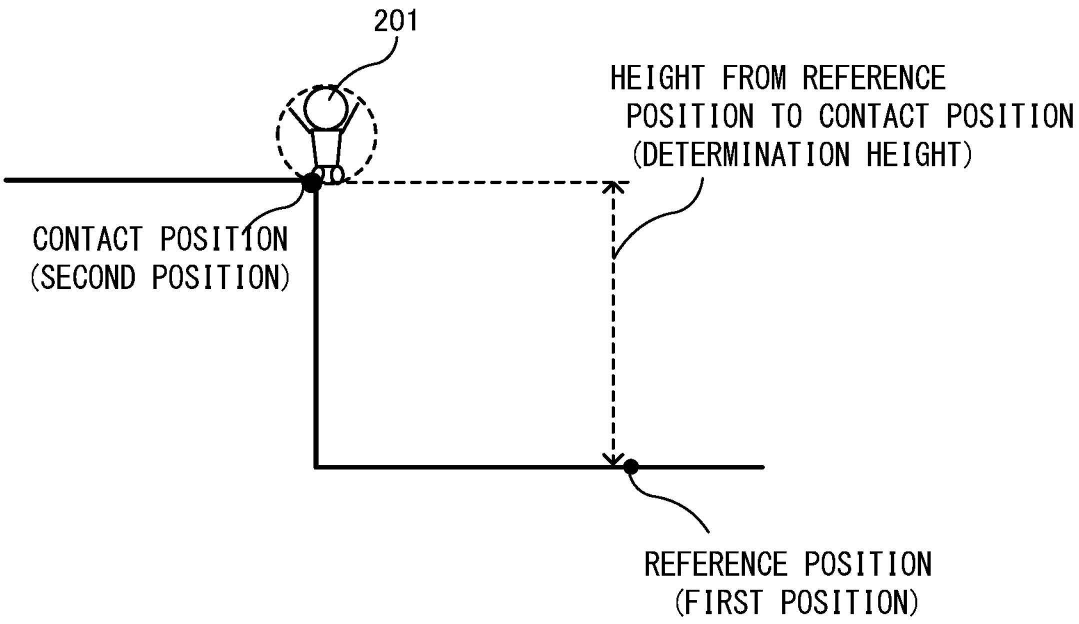
FIG. 16 illustrates the outline of the processing according to the exemplary embodiment.

It is assumed that after the PC 201 starts jumping as described above, a collision of a corner portion of the step and the collision of the PC 201 (foot part thereof) come into contact with each other as shown in FIG. 16. When such a contact occurs, this contact position is stored as a second position. Furthermore, in the exemplary embodiment, it is determined whether or not the vertical height of the contact position with respect to the above reference position (hereinafter, referred to as determination height) is equal to or greater than a predetermined threshold (hereinafter, referred to as height threshold). In the exemplary embodiment, as an example of the heights, it is assumed that the height threshold is 35 cm and the height of the highest reach point of the jump is 37 cm (both on a scale in the virtual space). As a result of the determination, if the determination height is equal to or greater than the height threshold, movement control in which the PC 201 is not caused to get over the step is performed. Specifically, the PC 201 is forced to move in a direction that is a direction away from the contact position (terrain object) and that is a direction toward the reference position side, such that the PC 201 rebounds (hereinafter, such forced movement is referred to as rebound movement). In other words, even in a state where the PC 201 can strictly (just barely) get over the step when considered without using the height threshold, the PC 201 is controlled so as to perform the rebound movement such that the PC 201 does not get over the step. On the other hand, if the determination height is less than the height threshold, the PC 201 is not caused to perform the rebound movement, and (normal) movement control based on a collision relationship between the terrain object and the PC 201 is performed.

Figure 17:
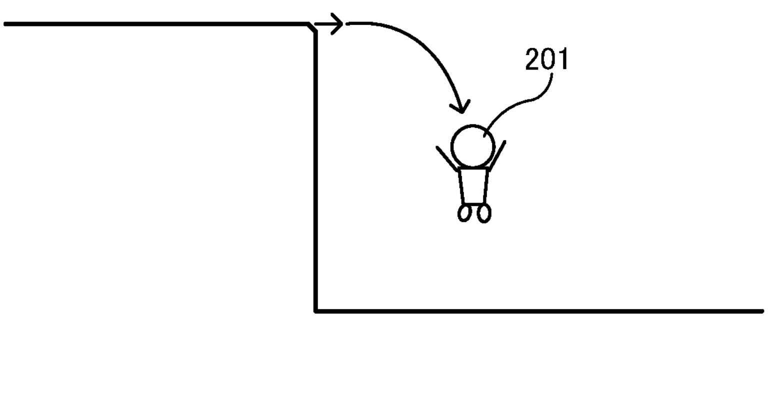
FIG. 17 illustrates the outline of the processing according to the exemplary embodiment.
Figure 18:
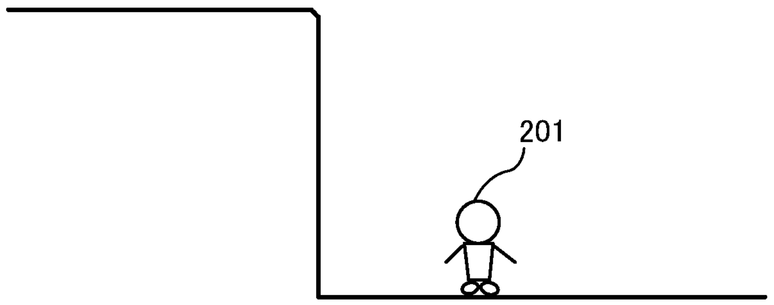
FIG. 18 illustrates the outline of the processing according to the exemplary embodiment.

FIG. 17 shows an example of the rebound movement. In the exemplary embodiment, the PC 201 is caused to perform the rebound movement in a direction normal to the surface at the collision position. However, when determining a movement direction at such rebound, an upward component is not reflected. In the example of FIG. 17, the traveling direction during the above jump is the left direction in FIG. 17, and the PC 201 moves in a direction (right direction in FIG. 17) opposite to the traveling direction. In this case, the trajectory is a trajectory in which, immediately after the PC 201 comes into contact with the corner portion of the step as shown in FIG. 16 above, the PC 201 does not rebound in the upper right direction in FIG. 17 but rebounds in the rightward direction, and then falls. Finally, the PC 201 lands on the ground as shown in FIG. 18.

Figure 19:
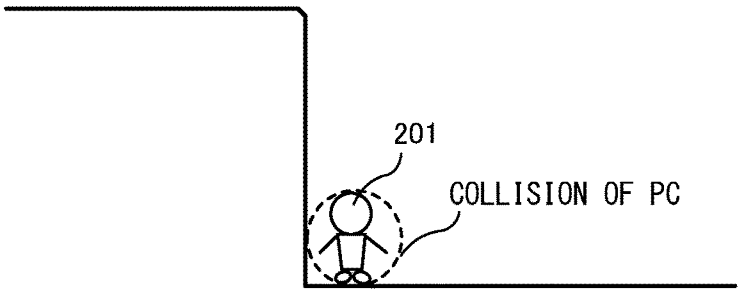
FIG. 19 illustrates a vertical jump.
Figure 20:
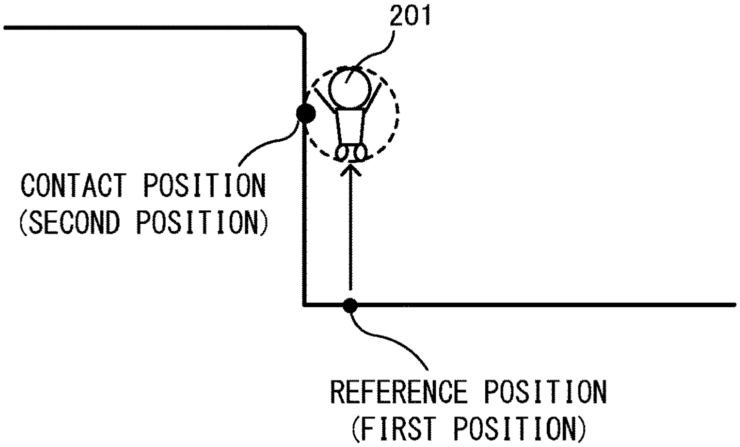
FIG. 20 illustrates a vertical jump.
Figure 21:
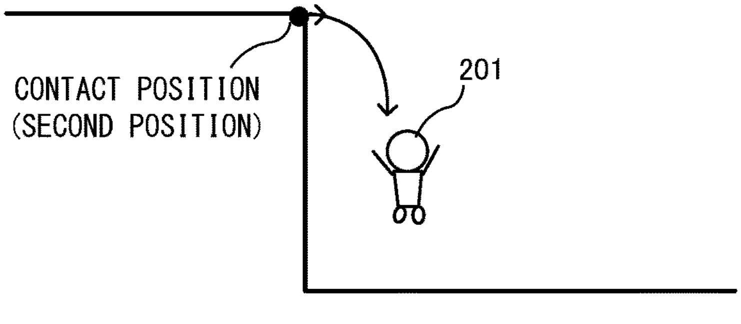
FIG. 21 illustrates a vertical jump.

Also, it is assumed that, for example, from a state where the PC 201 (collision thereof) is in close contact with the wall of the step as shown in FIG. 19, the PC 201 jumps vertically as shown in FIG. 20. In this case, the PC 201 moves upward along the wall while remaining in close contact with the wall, and as a result, when the vertical height of the contact portion between the collision of the PC 201 and the wall with respect to the reference position reaches the height threshold (e.g., when the corner portion of the step and the PC 201 (collision thereof) come into contact with each other), rebound movement in the direction toward the reference position side (right direction in FIG. 21) is performed as shown in FIG. 21.

As described above, in the exemplary embodiment, whether or not to perform control in which the rebound movement is performed (i.e., the step is not allowed to be got over) is determined on the basis of whether or not the determination height is equal to or greater than the height threshold. Therefore, for example, movement control in which the PC 201 simply rushes forward, hits the wall, and rebounds is not control based on whether or not the determination height is equal to or greater than the height threshold. Such control and the control of the exemplary embodiment are different from each other.

Figure 22:
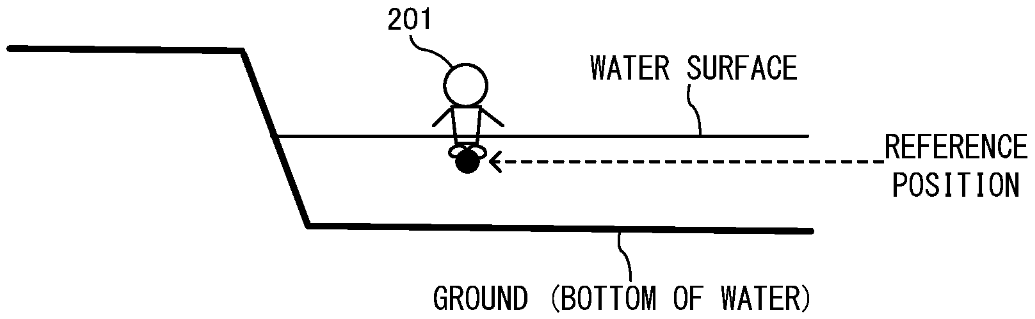
FIG. 22 illustrates a water surface jump.

Meanwhile, the above examples assume that the PC 201 jumps from the ground, but a game in which a jump called "water surface jump" is enabled is also assumed. For example, such a game may be a game in which the PC 201 can jump from a state where the PC 201 is floating on a water surface as shown in FIG. 22 (or swimming). In this case, as for the above reference position, the position of the feet of the PC 201 may be set as the reference position. That is, in the case of a water surface jump, a position on the water surface is not set as the reference position, and the position of the feet of the PC 201 is also set as the reference position in this case. Accordingly, it is possible to use the same threshold as the height threshold in both cases of a jump from the ground and a water surface jump. For example, it is assumed that in a state where the PC 201 is floating on the water surface, the feet of the PC 201 are below the water surface by 15 cm. It is also assumed that the height (highest reach point) of the water surface jump is 37 cm (22 cm from the water surface). In this case, if a position on the water surface is set as the reference position, the necessity to use a height threshold different from that in the case of a jump from the ground arises. Therefore, in the case of a water surface jump as well, by setting the position of the feet of the PC 201 as the reference position, the height (change thereof) of the feet when jumping becomes the same as when jumping from the ground, making it possible to use the above height threshold in a shared manner for both cases. Accordingly, a reduction in the load of the development can be expected.

Figure 23:
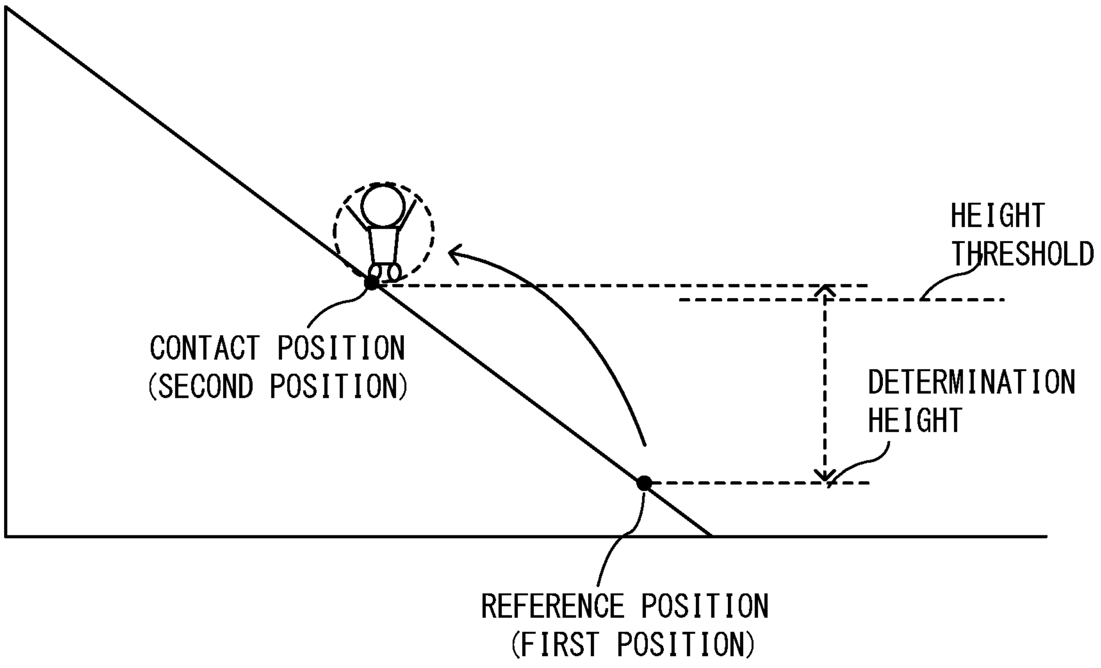
FIG. 23 illustrates landing on a slope.

Also, in the exemplary embodiment, when the place where the PC 201 lands after jumping is a "slope", control in which the above rebound movement is not performed is performed. Here, in the exemplary embodiment, the "slope" is assumed to be an inclined surface (road) that does not give an uncomfortable feeling even when the PC 201 lands thereon. For example, the "slope" is an inclined surface having an inclination angle of not less than 5 degrees and less than 45 degrees. In the exemplary embodiment, for example, a terrain object having such an inclined surface is defined as a "slope" in advance, and determination as to whether or not it is a "slope" is performed (the method of the determination will be described in detail later). For example, when the PC 201 jumps and lands at an uphill slope (that is gentle to some extent), the PC 201 may land at a position where the "determination height is equal to or greater than the height threshold" as shown in FIG. 23. If the PC 201 is caused to perform the rebound movement in such a case, the user may be made to feel uncomfortable. Therefore, when the landing destination is a "slope", the above determination and control for the rebound movement are not performed. In other words, when the PC 201 lands on a surface whose inclination angle is large to some extent (inclined surface that is so steep that it is unnatural to land on the surface), the above rebound movement is performed. Accordingly, the user can be prevented from being made to feel uncomfortable. In addition, for example, a movement mode of climbing an uphill slope by jumping can be prevented from being limited.

[Details of Game Processing of Exemplary Embodiment]

Next, the game processing in the exemplary embodiment will be described in more detail with reference to FIG. 24 to FIG. 30. Here, processing related to the above movement control for the jump will be mainly described, and the detailed description of other game processing is omitted.

[Data to be Used]

Figure 24:
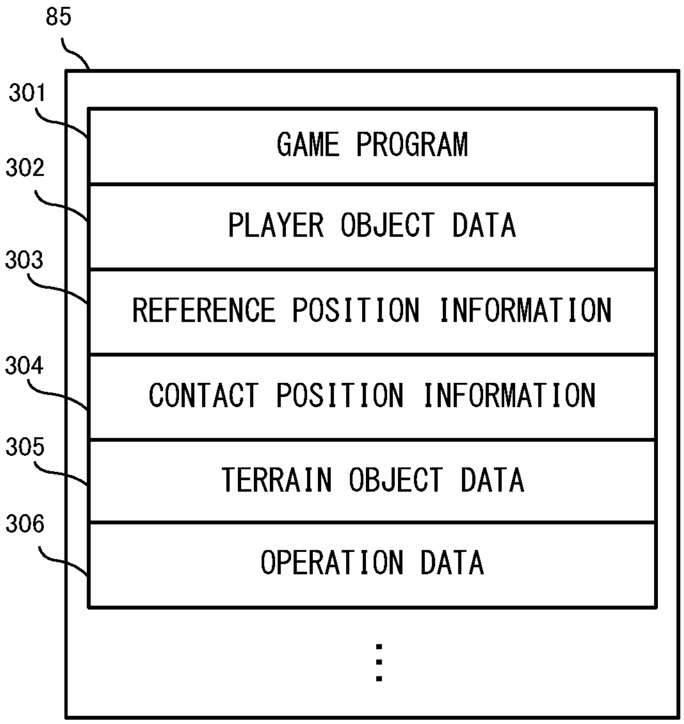
FIG. 24 illustrates a memory map showing a non-limiting example of various kinds of data stored in a DRAM 85.

First, various kinds of data to be used in the game processing will be described. FIG. 24 illustrates a memory map showing an example of various kinds of data stored in the DRAM 85 of the main body apparatus 2. In the DRAM 85 of the main body apparatus 2, at least a game program 301, player object data 302, reference position information 303, contact position information 304, terrain object data 305, and operation data 306 are stored.

The game program 301 is a program for executing the game processing in the exemplary embodiment.

Figure 25:
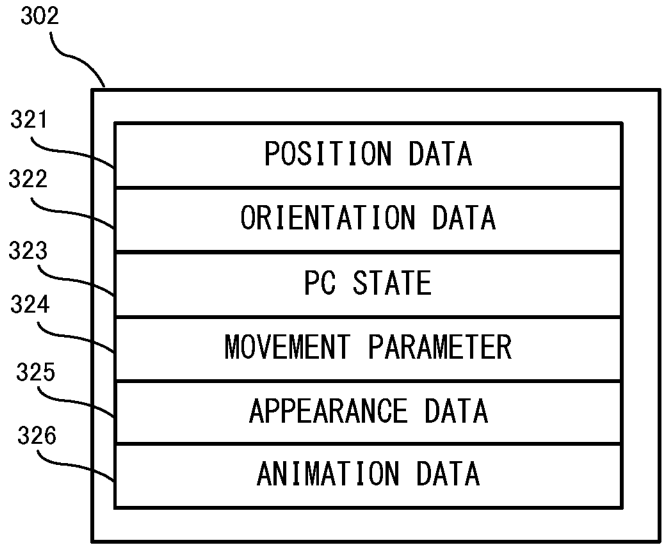
FIG. 25 shows a non-limiting example of player object data 302.

The player object data 302 is data regarding the above PC 201. FIG. 25 shows an example of the data structure of the player object data 302. The player object data 302 includes at least position data 321, orientation data 322, a PC state 323, a movement parameter 324, appearance data 325, and animation data 326.

The position data 321 is data indicating the current position of the PC 201 in the virtual game space. For example, three-dimensional coordinates in the virtual game space are stored in the position data 321. The orientation data 322 is data indicating the current orientation of the PC 201. For example, vector data indicating the direction in which the PC 201 is facing in the virtual game space, or the like is stored in the orientation data 322.

The PC state 323 is data indicating the current state of the PC 201 in the game processing. In the exemplary embodiment, as for the above control of the jump, at least any of information indicating the following states can be set in the PC state 323.

"Ground contacting": a state where the PC 201 is not jumping.

"Jumping": a state where the PC 201 is moving in a jumping motion.

"Mid-rebound movement": a state where the PC 201 is moving (forcibly) on the basis of the above-described control of the rebound movement.

The movement parameter 324 is a parameter to be used for the movement control of the PC 201. For example, the movement parameter 324 can include parameters that specify a movement speed such as initial speed and acceleration, a parameter indicating a movement direction, etc.

The appearance data 325 is data for forming the appearance of the PC 201. For example, the appearance data 325 includes 3D model data and texture data of the PC 201. In addition, the appearance data 325 may also include information for setting the shape and the size of the collision of the PC 201.

The animation data 326 is data that defines animations of various actions performed by the PC 201. For example, in the animation data 326, data of animations corresponding to the states indicated by the above PC state 323 are defined.

Referring back to FIG. 24, the reference position information 303 is data indicating the coordinates of the above-described reference position. The contact position information 304 is data indicating the coordinates of the above-described contact position.

The terrain object data 305 is data of various terrain objects to be placed in the virtual space. The terrain object data 305 includes data of 3D models indicating the shapes and the sizes of the various terrain objects, and texture data of the various terrain objects. In addition, the terrain object data 305 may include information for setting a collision of each terrain object. In the exemplary embodiment, a collision that matches a mesh of each terrain object is set as described above. Accordingly, it is possible for the user to visually determine to some extent whether or not a step is a step that can be got over by a jump. In another exemplary embodiment, the collision and the mesh may not necessarily strictly match each other, and there may be a slight difference in size or shape therebetween. That is, there may be a difference therebetween that does not make the user feel uncomfortable such as "there is an invisible wall". Even if there is such a difference that does not make the user feel uncomfortable, the mesh and the collision may be treated as substantially "matching" each other.

Figure 26:
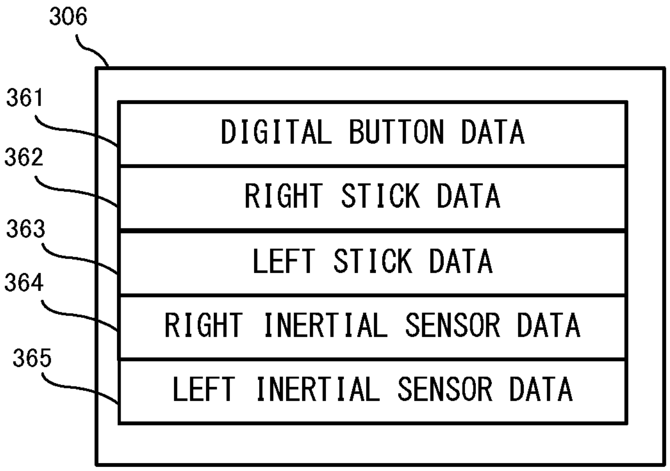
FIG. 26 shows a non-limiting example of operation data 306.

The operation data 306 is data obtained from the controller operated by the user. That is, the operation data 306 is data indicating the content of an operation performed by the user. FIG. 26 illustrates an example of the data structure of the operation data 306. The operation data 306 includes at least digital button data 361, right stick data 362, left stick data 363, right inertial sensor data 364, and left inertial sensor data 365. The digital button data 361 is data indicating pressed states of various buttons of the controllers. The right stick data 362 is data for indicating the content of an operation on the right stick 52. Specifically, the right stick data 362 includes two-dimensional data of x and y. The left stick data 363 is data for indicating the content of an operation on the left stick 32. The right inertial sensor data 364 is data indicating the detection results of the inertial sensors such as the acceleration sensor 114 and the angular velocity sensor 115 of the right controller 4. Specifically, the right inertial sensor data 364 includes acceleration data for three axes and angular velocity data for three axes. The left inertial sensor data 365 is data indicating the detection results of the inertial sensors such as the acceleration sensor 104 and the angular velocity sensor 105 of the left controller 3.

In addition, various kinds of data required for the game processing, which are not shown, such as data regarding non-player characters (NPCs), are also stored in the DRAM 85.

[Details of Processing Executed by Processor 81]

Next, the details of the game processing in the exemplary embodiment will be described. Flowcharts described below are merely an example of the processing. Therefore, the order of each process step may be changed as long as the same result is obtained. In addition, the values of variables and thresholds used in determination steps are also merely examples, and other values may be used as necessary.

Figure 27:
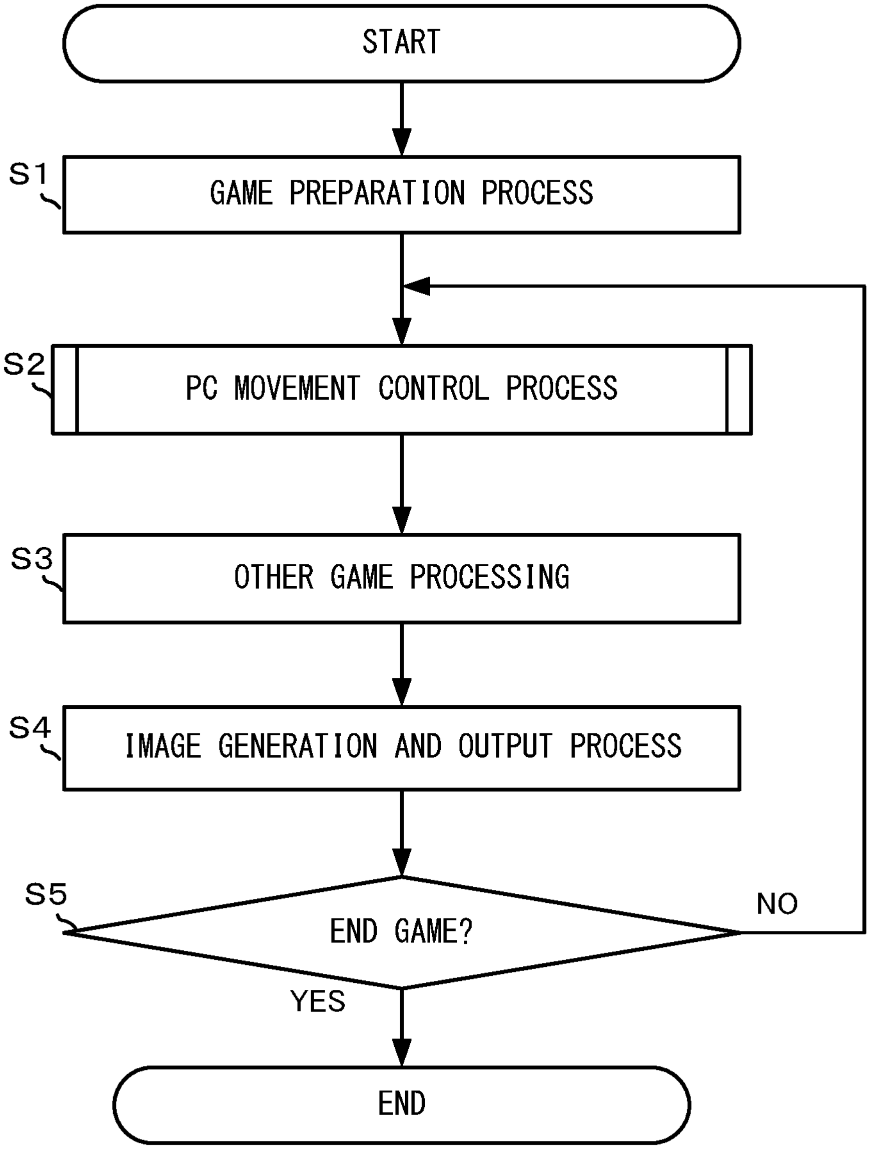
FIG. 27 is a non-limiting example flowchart showing the details of game processing according to the exemplary embodiment.

FIG. 27 is a flowchart showing the details of the game processing according to the exemplary embodiment. A process loop of steps S1 to S5 in FIG. 27 is repeatedly executed every frame period.

[Preparation Process]

First, in step S1, the processor 81 executes a game preparation process for starting the game. In this process, a process of constructing a virtual three-dimensional space including a game field, and placing various objects such as terrain objects, the PC 201, and NPCs, is performed. Then, a game image is generated by taking an image of the virtual space, in which the various objects have been placed, with the virtual camera, and is outputted to the stationary monitor or the like. In addition, various kinds of data used for the following processes are also initialized. Here, "ground contacting" is set as an initial state in the PC state 323.

[PC Movement Control Process]

Figure 28:
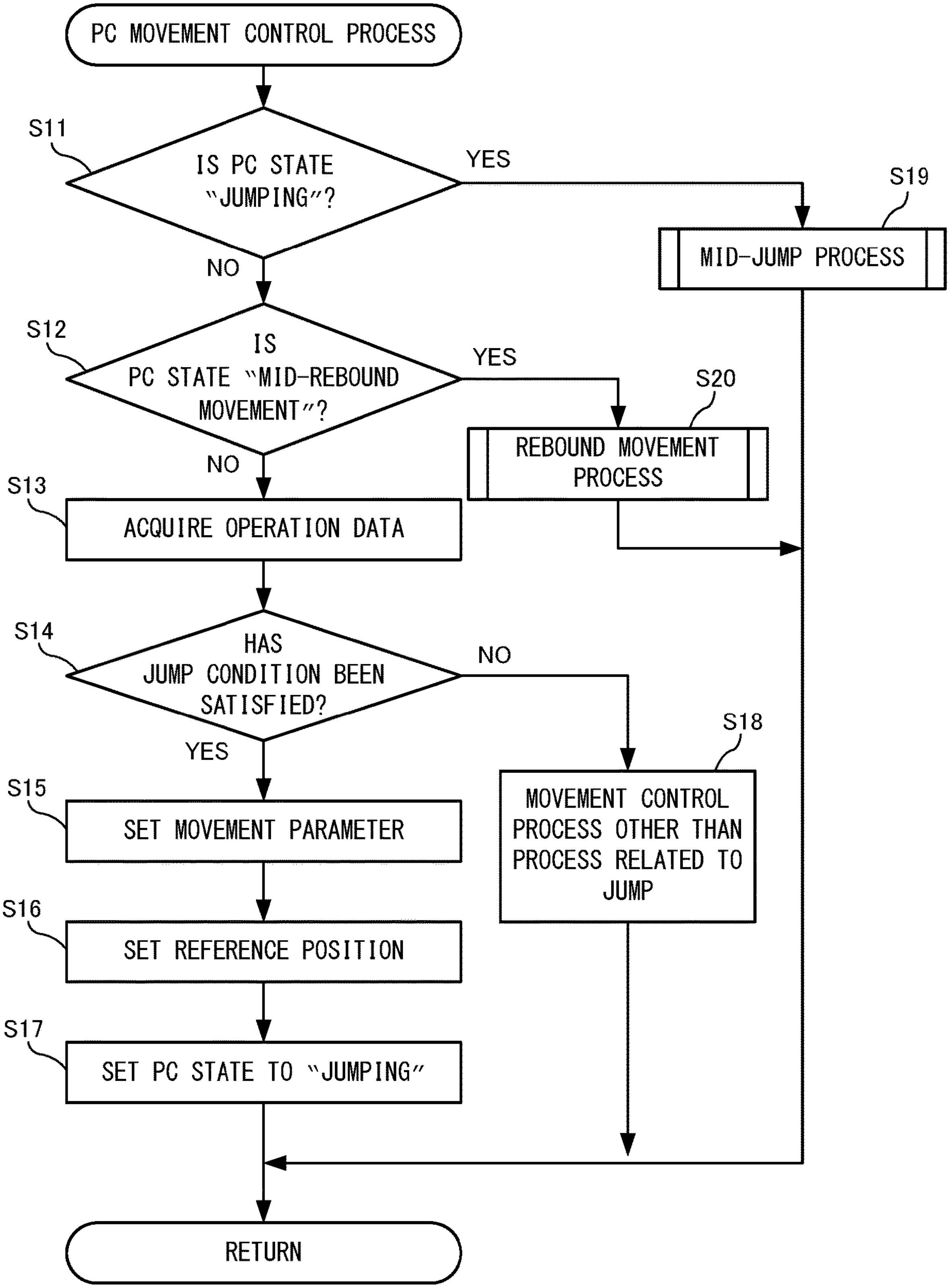
FIG. 28 is a non-limiting example flowchart showing the details of a PC movement control process.

Next, in step S2, the processor 81 executes a PC movement control process. In this process, a process for reflecting the content of an operation by the user in the movement of the PC 201 is performed. FIG. 28 is a flowchart showing the details of the PC movement control process. In FIG. 28, first, in step S1, the processor 81 determines whether or not the PC state 323 is "jumping". As a result of the determination, if the PC state 323 is not "jumping" (NO in step S11), in step S12, the processor 81 determines whether or not the PC state 323 is "mid-rebound movement". As a result of the determination, if the PC state 323 is also not "mid-rebound movement" (NO in step S12), in step S13, the processor 81 acquires the operation data 306.

Next, in step S14, the processor 81 determines whether or not a jump condition has been satisfied. The jump condition is a condition for the PC 201 in a state of "ground contacting" to shift to "jumping". Specifically, the jump condition is a condition that a predetermined jump operation is performed (e.g., the A-button 53 is pressed) when the PC state 323 is "ground contacting". In addition, even when an explicit jump operation has not been performed, for example, if the PC 201 gets on a jump stand installed in the virtual space, it can also be determined that the jump condition is satisfied.

As a result of the determination, if the jump condition has been satisfied (YES in step S14), in step S15, the processor 81 sets the movement parameter 324 of the PC 201 for a jump. That is, a direction in which the PC 201 jumps, a movement speed, and a height to which the PC 201 jumps are calculated on the basis of the operation data 306, etc., and are set in the movement parameter 324.

Next, in step S16, the processor 81 sets the above reference position. Specifically, the processor 81 sets the position at which the feet of the PC 201 and the ground are in contact with each other (the position at which the PC 201 jumps), in the reference position information 303 on the basis of the content of the current position data 321 of the PC 201.

If the jump corresponds to the above-described "water surface jump", the position of the feet of the PC 201 may be set in the reference position information 303. In addition, in the exemplary embodiment, the current position of the PC 201 at the frame in which the jump condition becomes satisfied is set as the reference position, but in another exemplary embodiment, the position of the PC 201 at the immediately previous frame may be set as the reference position.

Next, in step S17, the processor 81 sets "jumping" in the PC state 323. Then, the processor 81 ends the PC movement control process.

Figure 29:
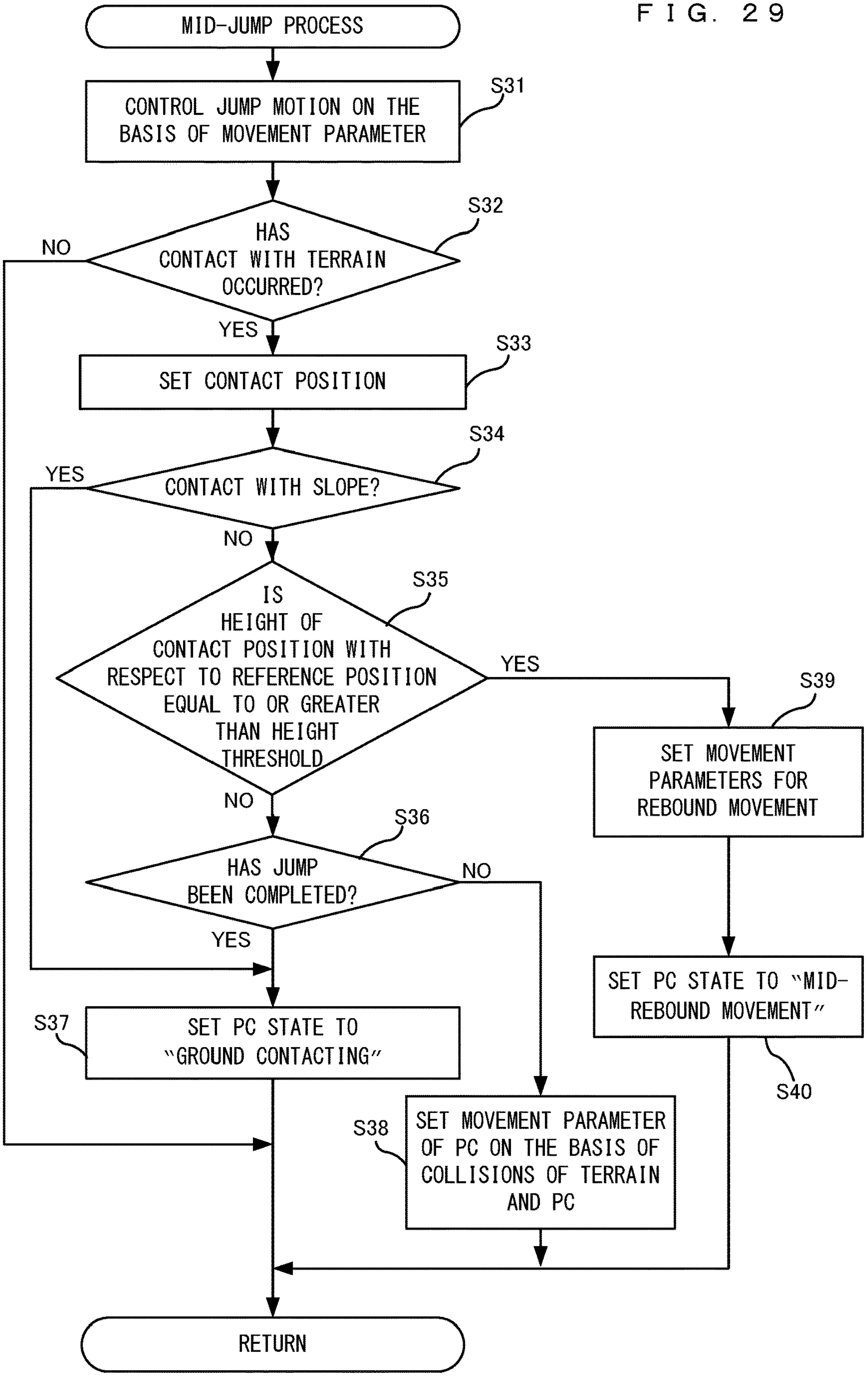
FIG. 29 is a non-limiting example flowchart showing the details of a mid-jump process.

Next, a process in the case where, as a result of the determination in step S11 above, the PC state 323 is "jumping" (YES in step S1) will be described. In this case, in step S19, the processor 81 executes a mid-jump process. FIG. 29 is a flowchart showing the details of the mid-jump process. In FIG. 29, first, in step S31, the processor 81 causes the PC 201 to move (i.e., move while jumping) on the basis of the movement parameter 324. In addition, along with this, the position data 321 can also be updated.

Next, in step S32, the processor 81 determines whether or not the collision of the PC 201 has come into contact with a terrain object. For example, when the PC 201 vertically jumps near a vertical wall, it can be determined that the PC 201 is in contact with the wall (terrain object) during this jump. As a result of the determination, if the collision of the PC 201 has not come into contact with any terrain object (NO in step S32), the processor 81 ends the mid-jump process.

On the other hand, if the collision of the PC 201 has come into contact with a terrain object (YES in step S32), in step S33, the processor 81 sets, in the contact position information 304, the position at which the collision of the PC 201 comes into contact with the terrain object.

Next, in step S34, the processor 81 determines whether or not the contacted terrain object is a slope. The method for determining whether or not the contacted object is a slope may be any method, but, for example, the following methods are conceivable. First, there is a method in which an "attribute" is assigned as one of the data for forming each terrain object. The "attribute" is information indicating what kind of terrain the terrain object is, such as "plain", "slope", and "water surface". When the above contact occurs, whether or not the contact is contact with a slope is determined by referring to the attribute of the terrain object. Another method is that the PC 201 emits a ray (straight line) in the downward direction directly below the PC 201, and whether or not the terrain object is a slope is determined on the basis of how the length of the ray is changed during the jumping period. For example, if the change is gradual, it can be determined that the terrain object is a slope, and if the change is abrupt, it can be determined that the terrain object is a step.

As a result of the determination, if the PC 201 has come into contact with a slope (YES in step S34), a process for completing the movement related to the jump (landing on the slope) is performed. That is, in step S37, the processor 81 sets "ground contacting" in the PC state 323.

On the other hand, if the PC 201 has not come into contact with a slope (NO in step S34), next, in step S35, the processor 81 calculates the height difference in the vertical direction between the reference position and the contact position as the above determination height. Then, the processor 81 determines whether or not the determination height is equal to or greater than the above height threshold. As a result of the determination, if the determination height is less than the height threshold (NO step S35), in step S36, the processor 81 determines whether or not the movement related to the jump has been completed. For example, the processor 81 determines whether or not the PC 201 has landed on the ground. As a result of the determination, if the movement related to the jump has been completed (YES in step S36), in step S37 above, the processor 81 sets "ground contacting" in the PC state 323.

On the other hand, if the movement related to the jump is still being performed (NO in step S36), in step S38, the processor 81 sets the movement parameter 324 of the PC 201 on the basis of the collision relationship between the terrain object and the PC 201. For example, in a situation in which the PC 201 is vertically jumping near a wall as described above, the movement parameter 324 is set such that the PC 201 is caused to move upward along the wall. Then, the processor 81 ends the mid-jump process.

On the other hand, as a result of the determination in step S35 above, if the determination height is equal to or greater than the height threshold (YES in step S35), setting for causing the PC 201 to perform the above-described rebound movement is performed. Specifically, first, in step S39, the processor 81 sets parameters for the rebound movement of the PC 201. Specifically, first, the processor 81 determines whether or not the surface at the contact position (hereinafter, contact surface) is close to being horizontal. For example, the processor 81 determines whether or not the vertical component of a normal vector of the contact surface is greater than a predetermined threshold (hereinafter, upward component threshold). For example, if the length of the normal vector is 1, the upward component threshold may be 0.8. If the vertical component is greater than the upward component threshold, the contact surface is considered to be close to being horizontal. As a result of the determination, if the vertical component is not greater than the upward component threshold, the processor 81 sets a vector obtained by removing the vertical component from the normal vector of the contact surface, as a rebound direction. Furthermore, the processor 81 sets a predefined initial speed and acceleration (for a certain period of time) as parameters of the movement speed. For example, an initial speed of 80 cm/s and an acceleration of 300 cm/s^2 (both on a scale in the virtual space) may be predefined as parameters. On the other hand, if the vertical component is greater than the upward component threshold, a rebound direction is set without using the normal vector of the contact surface. That is, the processor 81 calculates the direction from the contact position toward the reference position, and sets a rebound direction on the basis of this direction. In addition, for the movement speed in this case, an initial speed and acceleration are set in the same manner as above. That is, the method for determining a rebound direction is changed depending on whether or not the contact surface is a surface that can be considered to be nearly horizontal. This is because, when the contact surface is a surface that can be considered to be nearly horizontal, a horizontal vector obtained by removing the vertical component from the normal vector of the contact surface is shortened, and thus the direction of the horizontal vector changes significantly due to slight unevenness on the contact surface.

Next, in step S40, the processor 81 sets "mid-rebound movement" in the PC state 323. Then, the processor 81 ends the mid-jump process.

Figure 30:
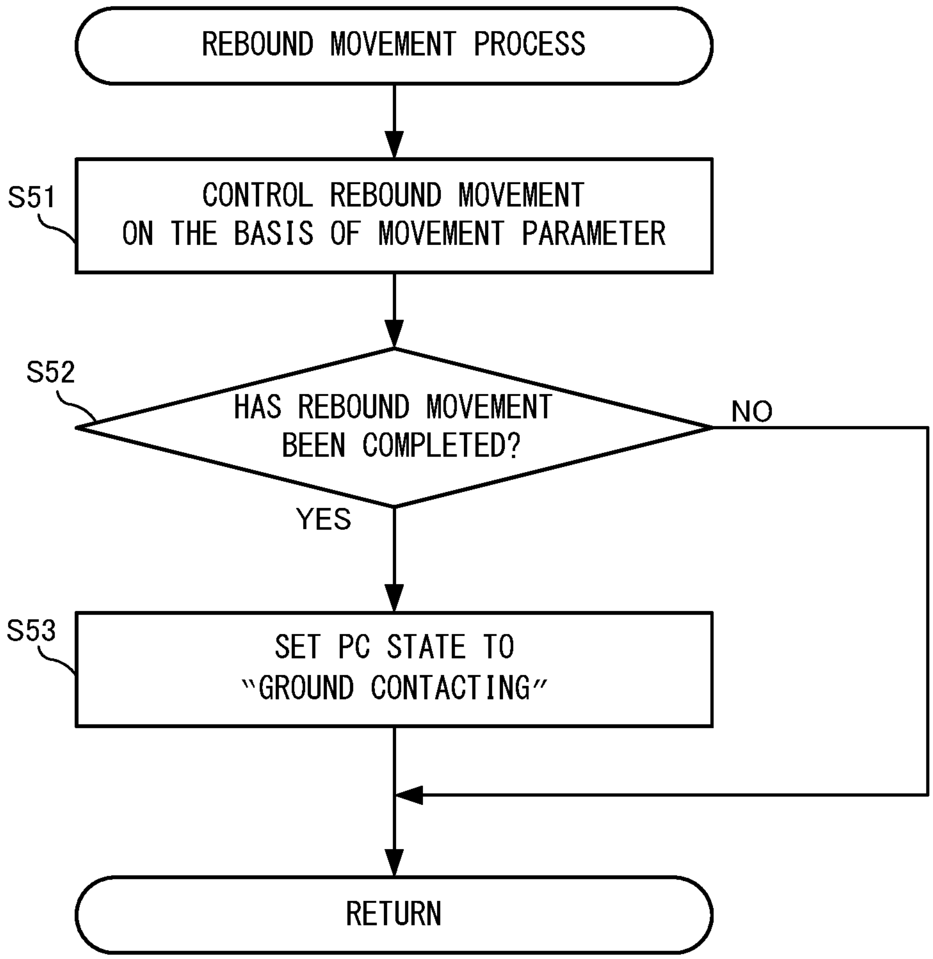
FIG. 30 is a non-limiting example flowchart showing the details of a rebound movement process.

Referring back to FIG. 28, next, a process in the case where, as a result of the determination in step S12 above, the PC state 323 is "mid-rebound movement" (YES in step S12) will be described. In this case, in step S20, the processor 81 executes a rebound movement process. FIG. 30 is a flowchart showing the details of the rebound movement process. In FIG. 30, first, in step S51, the processor 81 causes the PC 201 to move, on the basis of the movement parameter 324. That is, movement control related to the rebound movement is performed.

Next, in step S52, the processor 81 determines whether or not the rebound movement has been completed, that is, the series of movements from the start of the jump to the rebound movement has been completed. For example, whether or not the PC 201 has landed on the ground is determined. As a result of the determination, if the rebound movement has been completed (YES in step S52), in step S53, the processor 81 sets "ground contacting" in the PC state 323, and ends the rebound movement process. On the other hand, if the rebound movement has not been completed yet (NO in step S52), the process in step S53 above is skipped. That is, the movement control related to the rebound movement is continued.

Referring back to FIG. 28, when the rebound movement process ends, the processor 81 ends the PC movement control process.

Referring back to FIG. 27, next, in step S3, the processor 81 executes various types of game processing other than the above movement control of the PC 201. For example, movement control of the PC 201 based on an operation instruction from the user other than movement operations, movement control of the NPCs, processing based on determination as to contact between the PC 201 and an NPC, etc., are executed as appropriate.

Next, in step S4, the processor 81 generates a game image by taking an image of the virtual space in which the above processing is reflected, with the virtual camera, and outputs the game image to the stationary monitor or the like.

Next, in step S5, the processor 81 determines whether or not an end condition for the game processing has been satisfied. As a result, if the end condition has not been satisfied (NO in step S5), the processor 81 returns to step S2 above and repeats the processing. If the end condition has been satisfied (YES in step S5), the processor 81 ends the game processing.

This is the end of the detailed description of the game processing according to the exemplary embodiment.

As described above, in the exemplary embodiment, the control for the rebound movement which is forced movement that does not allow a step to be got over is performed on the basis of the relationship between the determination height and the height threshold. Accordingly, the range of movement of the PC 201 can be limited to a range intended by the developer, without giving an uncomfortable feeling for appearance due to the placement of a terrain object having a step. In addition, since the height of the jump itself is not adjusted when performing such control, the user's sense of operation for a jump is not impaired. Moreover, by showing an unnatural movement in which the PC 201 is caused to rebound and move and that is different from the movement expected when jumping, it is made easier for the user to recognize that the step is a step that cannot be got over by a jump.

[Modifications]

Figure 31:
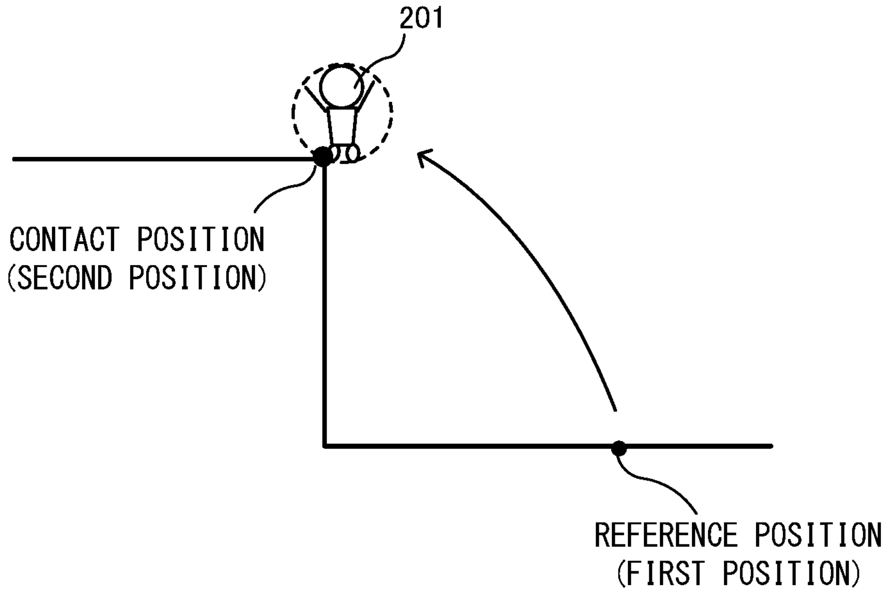
FIG. 31 shows a non-limiting example of a mode of the rebound movement.
Figure 32:
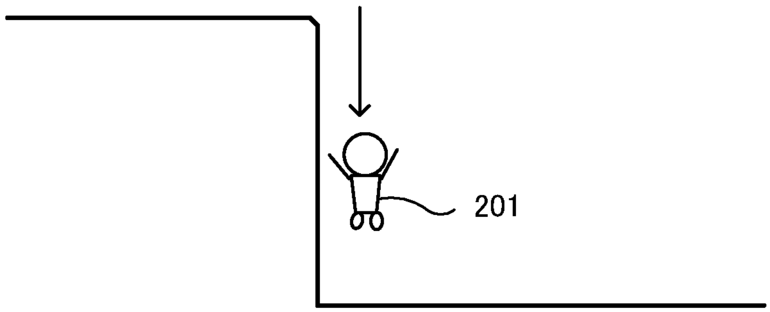
FIG. 32 shows a non-limiting example of a mode of the rebound movement.

As for the trajectory of the above-described rebound movement, the trajectory is not limited to a trajectory for causing the PC 201 to move in the direction toward the reference position side as described above, and, for example, the PC 201 may be forced to move in the downward direction along a terrain object as shown in FIG. 31 and FIG. 32. In this case, the PC 201 may not necessarily move so as to rebound in the direction toward the reference position side as described above, and may be caused to move directly downward as if the PC 201 was tightly attached to the wall in the example of FIG. 32. Alternatively, the PC 201 may be caused to move downward along the shape of the step after shifting slightly in the direction toward the reference position side.

In the exemplary embodiment, the example in which when determining the rebound movement direction, a vector obtained by removing the vertical component from the normal vector of the surface at the contact position is set as the rebound movement direction, has been described. In another exemplary embodiment, the rebound movement direction may be determined without removing the vertical component from the normal vector. In this case, the PC 201 moves so as to rebound perpendicular to the surface at the contact position. In addition, for example, if the vertical component of the normal vector of the surface at the contact position is positive (upward vector), the rebound movement direction may be determined with the vertical component being set to 0, and if the vertical component is negative (downward vector), the rebound movement direction may be determined by using the normal vector as it is.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein instructions that, when executed by a computer of an information processing apparatus, cause the computer of the information processing apparatus to perform operations comprising:

causing a player character to move and perform a target action in a virtual space in accordance with an input by a user;

determining a reference position based on a position of the player character before the player character performs the target action at a first position;

when the player character comes into contact with a terrain object at a second position by performing the target action, determining whether or not a height of the second position with respect to the reference position is equal to or greater than a height threshold; and when it is determined that the height of the second position with respect to the reference position is equal to or greater than the height threshold, causing the player character to move in a forced movement direction that is a direction toward the first position side with respect to the terrain object among directions away from the terrain object or is a downward direction along the terrain object, wherein a position at which the player character starts the target action is determined as the reference position.

2. The non-transitory computer-readable storage medium according to claim 1, wherein the player character is caused to perform a jump as the target action based on an input by the user.

3. The non-transitory computer-readable storage medium according to claim 2, wherein a position of feet of the player character when the player character starts the jump is determined as the reference position.

4. The non-transitory computer-readable storage medium according to claim 3, wherein the jump is controlled such that a height to which the feet of the player character are raised by the jump is the same when the feet of the player character are in contact with a ground in the virtual space and when the player character floats on a water surface and the feet of the player character are located below the water surface in the virtual space.

5. The non-transitory computer-readable storage medium according to claim 1, wherein, only when it is determined that the terrain object at the second position is not a slope, the player character is caused to move in the forced movement direction.

6. The non-transitory computer-readable storage medium according to claim 1, wherein a direction based on a normal direction at the second position of the terrain object is used as the forced movement direction.

7. The non-transitory computer-readable storage medium according to claim 6, wherein, when the normal direction at the second position of the terrain object includes a vertical component, a direction obtained by setting the vertical component to 0 in the normal direction is used as the forced movement direction.

8. The non-transitory computer-readable storage medium according to claim 1, wherein, when a vertical component of a normal direction at the second position of the terrain object is greater than an upward component threshold, a direction from the second position toward the first position is used as the forced movement direction.

9. The non-transitory computer-readable storage medium according to claim 1, wherein, when it is determined that the height of the second position with respect to the reference position is less than the height threshold, the player character is caused to move based on a collision of the terrain object and a collision of the player character.

10. The non-transitory computer-readable storage medium according to claim 1, wherein, even when the player character comes into contact with the terrain object at the second position along the terrain object by performing the target action, when it is determined that the height of the second position with respect to the reference position is equal to or greater than the height threshold, the player character is caused to move in the forced movement direction.

11. The non-transitory computer-readable storage medium according to claim 1, wherein a mesh of the terrain object and the collision of the terrain object match each other.

12. An information processing apparatus comprising a memory and at least one processor configured to execute a program stored in the memory to perform operations comprising:

causing a player character to move and perform a target action in a virtual space in accordance with an input by a user;

determining a reference position based on a position of the player character before the player character performs the target action at a first position;

when the player character comes into contact with a terrain object at a second position by performing the target action, determining whether or not a height of the second position with respect to the reference position is equal to or greater than a height threshold; and when it is determined that the height of the second position with respect to the reference position is equal to or greater than the height threshold, causing the player character to move in a forced movement direction that is a direction toward the first position side with respect to the terrain object among directions away from the terrain object or is a downward direction along the terrain object, wherein a position at which the player character starts the target action is determined as the reference position.

13. An information processing system comprising a processor and a memory coupled thereto, the processor being configured to control the information processing system to at least:

cause a player character to move and perform a target action in a virtual space in accordance with an input by a user;

determine a reference position based on a position of the player character before the player character performs the target action at a first position;

when the player character comes into contact with a terrain object at a second position by performing the target action, determine whether or not a height of the second position with respect to the reference position is equal to or greater than a height threshold; and when it is determined that the height of the second position with respect to the reference position is equal to or greater than the height threshold, cause the player character to move in a forced movement direction that is a direction toward the first position side with respect to the terrain object among directions away from the terrain object or is a downward direction along the terrain object, wherein a position at which the player character starts the target action is determined as the reference position.

14. An information processing method executed by a computer of an information processing apparatus, the information processing method comprising:

causing a player character to move and perform a target action in a virtual space in accordance with an input by a user;

determining a reference position based on a position of the player character before the player character performs the target action at a first position;

when the player character comes into contact with a terrain object at a second position by performing the target action, determining whether or not a height of the second position with respect to the reference position is equal to or greater than a height threshold; and when it is determined that the height of the second position with respect to the reference position is equal to or greater than the height threshold, causing the player character to move in a forced movement direction that is a direction toward the first position side with respect to the terrain object among directions away from the terrain object or is a downward direction along the terrain object, wherein a position at which the player character starts the target action is determined as the reference position.

15. The information processing system according to claim 13, wherein, only when it is determined that the terrain object at the second position is not a slope, the player character is caused to move in the forced movement direction.

16. The information processing system according to claim 13, wherein a direction based on a normal direction at the second position of the terrain object is used as the forced movement direction.

17. The information processing system according to claim 16, wherein, when the normal direction at the second position of the terrain object includes a vertical component, a direction obtained by setting the vertical component to 0 in the normal direction is used as the forced movement direction.

18. The information processing system according to claim 13, wherein, when a vertical component of a normal direction at the second position of the terrain object is greater than an upward component threshold, a direction from the second position toward the first position is used as the forced movement direction.

19. The information processing system according to claim 13, wherein, when it is determined that the height of the second position with respect to the reference position is less than the height threshold, the player character is caused to move based on a collision of the terrain object and a collision of the player character.

20. The information processing system according to claim 13, wherein, even when the player character comes into contact with the terrain object at the second position along the terrain object by performing the target action, when it is determined that the height of the second position with respect to the reference position is equal to or greater than the height threshold, the player character is caused to move in the forced movement direction.

* * * * *